United States Patent [19]
Aras et al.

[11] Patent Number: 5,872,588
[45] Date of Patent: Feb. 16, 1999

[54] METHOD AND APPARATUS FOR MONITORING AUDIO-VISUAL MATERIALS PRESENTED TO A SUBSCRIBER

[75] Inventors: Caglan M. Aras; Luther B. Griffin; Fuyung Lai; Arthur James Stagg, all of Raleigh; Kian-Bon Kho Sy, Cary, all of N.C.

[73] Assignee: International Business Machines Corporation, Armonk, N.Y.

[21] Appl. No.: 568,113

[22] Filed: Dec. 6, 1995

[51] Int. Cl.[6] .......................................................... H04N 7/16
[52] U.S. Cl. ................................ 348/1; 455/2; 455/6.2; 348/10
[58] Field of Search .................................. 348/1, 2, 3, 4, 348/5, 6, 7, 8, 9, 10, 11, 12, 13; 455/2, 4.2, 6.1, 6.2, 6.3, 5.1; H04N 7/16, 7/173

[56] References Cited

U.S. PATENT DOCUMENTS

| | | | |
|---|---|---|---|
| 4,602,279 | 7/1986 | Freeman | 358/86 |
| 4,633,462 | 12/1986 | Stifle et al. | 370/85 |
| 4,977,455 | 12/1990 | Young | 358/142 |
| 5,027,400 | 6/1991 | Baji et al. | 380/20 |
| 5,077,607 | 12/1991 | Johnson et al. | 358/86 |
| 5,133,079 | 7/1992 | Ballantyne et al. | 455/4.1 |
| 5,151,789 | 9/1992 | Young | 358/194.1 |
| 5,245,429 | 9/1993 | Virginio et al. | 358/142 |
| 5,251,324 | 10/1993 | McMullan, Jr. | 455/2 |
| 5,260,778 | 11/1993 | Kauffman et al. | 358/86 |
| 5,301,028 | 4/1994 | Banker et al. | 348/570 |
| 5,319,455 | 6/1994 | Hoarty et al. | 348/7 |
| 5,481,294 | 1/1996 | Thomas et al. | 348/1 |
| 5,526,427 | 6/1996 | Thomas et al. | 348/1 |
| 5,532,732 | 7/1996 | Yuen et al. | 348/1 |
| 5,534,911 | 7/1996 | Levitan | 348/1 |
| 5,574,963 | 11/1996 | Weinblatt et al. | 348/1 |
| 5,600,364 | 2/1997 | Hendricks et al. | 348/1 |

FOREIGN PATENT DOCUMENTS

| | | |
|---|---|---|
| 0393555 | 10/1990 | European Pat. Off. . |
| 9107050 | 5/1991 | WIPO . |
| 9206438 | 4/1992 | WIPO . |
| 9400842 | 1/1994 | WIPO . |

OTHER PUBLICATIONS

IEEE, May 1995, pp. 25–39, "Design Issues for Interactive Television System" Technology 1994, IEEE Spectrum, Jan. 1994, :Consumer Electronics, pp. 30–34.

1994 IEEE, "Prospects for Interactive Video–on–Demand" pp. 14–24.

*Primary Examiner*—Chris Grant
*Attorney, Agent, or Firm*—John D. Flynn

[57] ABSTRACT

A method and apparatus for content coding of Audio-Visual materials is presented. The content coding can then be decoded by a home station where the content coding is collected and processed. The content codes are utilized by the subscribers home station to collect information on the subscribers selection of AVM streams and record information on which AVMs have been presented to the subscriber. An audio-video material distribution system is described for supplying AVM streams to home station via a local distribution network. The home stations decode the content coding from the AVM streams and collect the encoded content codes. The collected content codes are then sent to collection centers for processing. The encoded information may also utilized to provide management of an upstream channel between the home stations and the video distribution node.

99 Claims, 32 Drawing Sheets

| NAME | FUNCTION | RANGE |
|---|---|---|
| AVI.STATE | INDICATES ARRIVAL OF AVI RECORD IN CURRENT AVI PERIOD. | NO_AVI, NEW_AVI CHANGED_AVI, SAME_AVI. |
| AVI.TIMER | COUNTDOWN TIMER FOR AVI RECORD ARRIVALS | 0...T_AVI |

FIG. 5

| NAME | FUNCTION | RANGE |
|---|---|---|
| AVI.STATE | ARRIVAL OF AVI RECORD IN CURRENT AVI PERIOD. | NO_AVI, NEW_AVI, CHANGED_AVI, SAME_AVI |
| AVI.TIMER | COUNTDOWN TIMER FOR AVI RECORD ARRIVALS | $0...T_{AVI}$ |
| SURF.STATE | SUBSCRIBER CHANNEL-SURFING INDICATOR | SURF, WATCH |
| SURF.TIMER | TIMER TO DETECT USER CHANNEL SURFING | $0...T_{SURF}$ |

FIG. 7

| 601 | 603 | 605 |
| --- | --- | --- |
| AVI | START INDEX | LAST INDEX |
| 343-567-231 | 12 | 18 |
| 565-778-543 | 967 | 1200 |
| — | — | — |

FIG. 10

| | 601 | | 603 | | 605 | | 607 |
|---|---|---|---|---|---|---|---|
| | AVI | | START INDEX | | LAST INDEX | | SURFED |
| | 343-567-231 | | 12 | | 18 | | 1 |
| | 565-778-543 | | 967 | | 1200 | | 0 |
| | 789-446-553 | | 121 | | 160 | | 0 |

FIG. 11

| AVI | START INDEX | START TIME | END TIME |
|---|---|---|---|
| 343-567-231 | 12 | 13:18:53 | 13:25:00 |
| 565-778-543 | 967 | 13:26:01 | 16:37:41 |
| — | — | — | — |

| AVI | TITLE | RATING | START TIME | STOP TIME | SENT | COST |
|---|---|---|---|---|---|---|
| | | | | | | |
| | | | | | | |
| | | | | | | |

FIG. 13

METHOD AND APPARATUS FOR MONITORING AUDIO-VISUAL MATERIALS PRESENTED TO A SUBSCRIBER

BACKGROUND OF THE INVENTION

RELATED APPLICATIONS

The present invention relates to "A METHOD AND APPARATUS FOR SCREENING AUDIO-VISUAL MATERIALS PRESENTED TO A SUBSCRIBER" Ser. No.: 08/568,166 filed Dec. 6, 1995 assigned to the same assignee as the present invention, herein incorporated by reference.

1. Field of the Invention

The present invention relates to a method and apparatus for collecting and recovering subscriber behavior from a plurality of home stations in a broadcast and/or interactive service distributing audio-visual materials. More particularly, it relates to a method and apparatus involving, a universal audio-visual identification code embedded in audio-visual materials, a software system residing in the home station to monitor and record the viewing of these audio-visual materials and returning the collected data to a behavior collection center for interpretation, accumulation and processing.

2. Description of the Prior Art

Broadcast and/or Interactive television may be distributed over a variety of means, including but not limited to coaxial-analog or digital and fiber-coax cable systems, ADSL (Asymmetrical Digital Subscriber Loop), wireless and satellite distribution systems. In most cases, interactive television will co-exist with broadcast television in both its current analog form and, in the future, in its digital form.

Broadcast television is currently distributed over the air, satellite systems and over Community Access Television (CATV) systems. Most systems are designed for two-way transmission, only requiring the installation of upstream amplifiers and upstream transmitters in set-top terminals in the home to complete the two-way loop. Certain services such as impulse Pay-Per-View, where a subscriber may purchase a movie on impulse by simply ordering it through the set-top terminal, already make use of the upstream capabilities of a TV broadcast system. The upstream-channel is not unique to analog TV. Other digital broadcast systems such as an HDTV over digital cable transmission, ADSL and wireless will also have the capability to transmit data from the subscriber set-top terminal to a central control location.

Television marketing has not enjoyed the technological tools available to consumer goods marketers. Data supplied by rating agencies such as the Nielsen or Arbitron are limited to very small samples of the U.S. television viewing market. This is in part due to the difficulty of compiling data on every television viewer. Although surveys have been considered to be adequate as decision aids for show productions, they have not allowed for the customization of programming on a smaller sample, as in neighborhoods or on a per viewer basis.

Interactive television promises viewers the ability to view what they want, when they want. However, as any marketing person can profess, the consumer usually does not know what he or she wants until they are informed of their choices. Since there will be a plethora of choices offered by Interactive TV (ITV) viewers, accurate targeting of interactive television content is as valuable as in its parallel in the consumer goods market.

In addition to the marketing of interactive services, user viewing information is also useful for targeted advertising. Advertisements can be customized on a per area or even per viewer basis to increase their effectiveness. Without accurate targeting, a movie, game, advertisement, or in general, any interactive service, will be lost in the multitude of choices. In summary, proper targeting of interactive services and advertisements will become an essential part of marketing interactive services and making the most of the installed infrastructure.

Advertising rates for commercials for TV programs are determined by the expected size of the viewer audience for a predetermined number of television programs. These expectations are usually determined the estimated audience sizes of previously broadcast shows. For example, a weekly television series, the estimate of audience size for upcoming episodes is based on the estimated size of previously broadcast shows. In addition advertising rates may be adjusted based on an "after the fact" estimation of the market share for the televised program.

Present systems for estimating market share involve survey evidence such as the Nielsen ratings. Previous market data was taken by selecting households to record their viewing habits. For example, a selected household might record in a written journal or diary when the television is turned on and turned off, what channels are selected and the number of viewers in the room. This data may alternatively be collected by providing the user with an electronic device having a button that indicates turning on or off the television and the channel selected. Other systems are connected directly to the television that will monitor power on and off and the channel and time of the selected programs. The system is wired to a dedicated telephone line. When instructed, the electronics dump their memory over the phone line to a central computer for analysis. Each of these systems requires selecting individual households that represent an adequate sample of the general viewing audience and requires physically setting up the monitoring apparatus. These systems are inaccurate because the sample size is small, diary entries may be erroneous, or require viewer action.

Collecting subscriber behavior in a set-top can be provided by collecting user channel transitions. However, such statistics do not provide for the collection of any information about the viewed material itself. Since the viewed material may be received through a variety of channels controlled by more than one source (for example some signals may be generated by the cable-tv company while others may be produced by local stations), simply recording channel transitions and relaying them to a central processing point will not be sufficient to collect accurate viewing statistics.

Consequently, there remains a need for a method to universally identify audio-visual material broadcast through ITV (analog or digital) systems and to record these in an efficient manner to produce viewing statistics.

SUMMARY OF THE INVENTION

The above-mentioned long-felt need has been met in accordance with the present invention.

It is an object of the invention to provide a method and apparatus that links presentation of Audio-Visual Materials with subscriber selections.

It is an object of the invention to provide accurate subscriber viewership information.

It is an object of the invention to provide an indication of subscriber viewership on a real time basis.

It is another object of the invention to provide for bandwidth management of the upstream channel.

It is a further object of the invention to provide for control of the amount of data sent and when it is sent from subscribers using information encoded in Audio Visual materials.

In accordance with a preferred embodiment of the present invention, a method, apparatus and article of manufacture for collecting information on audio-visual materials presented to a subscribers. Information is collected by content coding of audio-visual materials provided to the subscriber by a video distribution node with audio-visual identifier information. The audio-visual identifier information is decoded by a home station where the information is collected and processed. The content coding information can then be utilized by the subscribers home station to collect information on the subscribers selection of audio-visual material (AVM) streams and record information on which AVMs have been presented to the subscriber. An audio-video material distribution system supplies AVM streams to home stations via a local distribution network. The home stations decode the content coding from the AVM streams and collect the encoded content codes. The collected content codes are then sent to collection centers for processing. The encoded information may also be utilized to provide management of an upstream channel between the home stations and the video distribution node.

BRIEF DESCRIPTION OF THE DRAWINGS

The foregoing and other objects, aspects and advantages of the invention will be better understood from the following detailed description with reference to the drawings, in which:

FIG. 5 provides a table of variable for behavior collection.

FIG. 7 provides a table of variables for behavior collection using a surfing filter.

FIG. 10 shows one embodiment of a Behavior Capture Table (BCT) including the Audio Visual Identifier, Start Index, Last Index.

FIG. 11 shows an embodiment of a behavior capture table including the Audio Visual Identifier, Start Index, Last Index and Surf Bit.

FIG. 12 shows an alternative embodiment of a behavior capture table including the Audio Visual Identifier, Start Index, Start Time, End Time.

Figure 13:
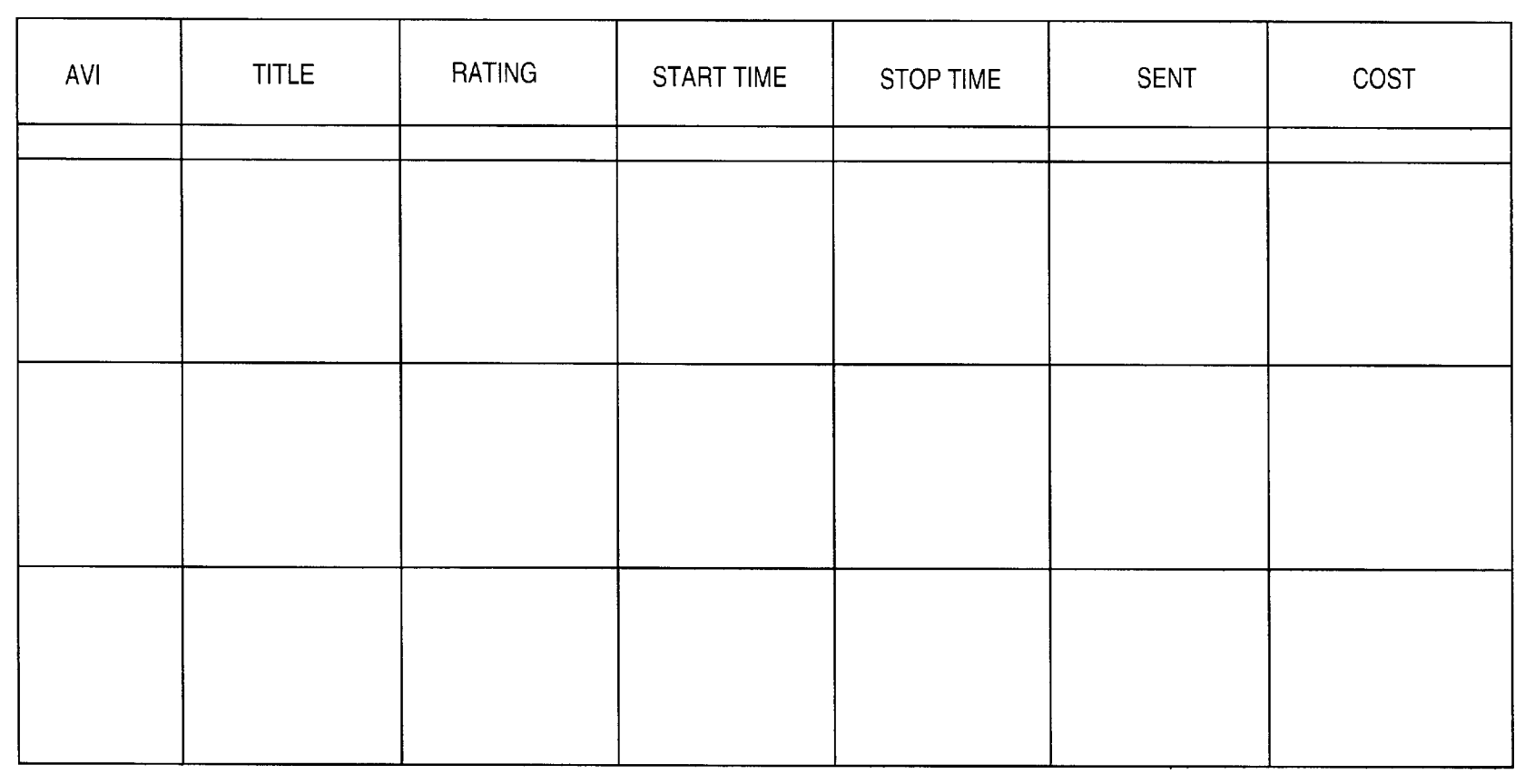

FIG. 13 shows an alternative embodiment of a behavior capture table including the AVI, Title, Rating, Start Time, Stop Time, Sent, and Cost.

OVERVIEW

Figure 1A:
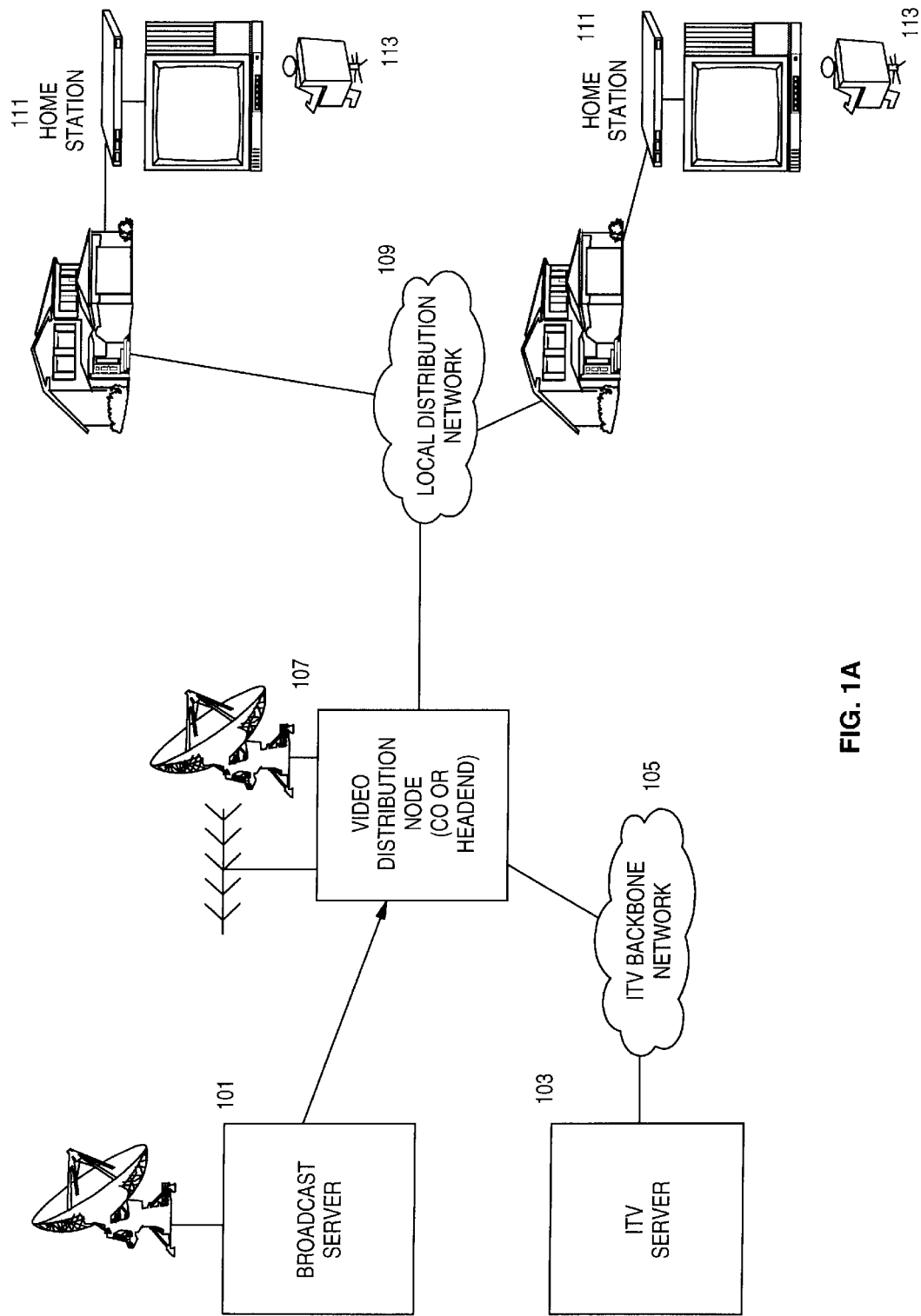
FIG. 1(a) is an overview of an interactive television system.

FIG. 1(a) shows an overall system configuration for an interactive TV system. Note that although an ITV system is described below, the present invention may be used with any TV system that provides a return channel for sending back the collected information. An ITV system consists of the following major components: servers (101,103), backbone network 105, distribution node 107, local distribution network 109, and home stations 111. The home stations can be embodied in the form of a settop, PC, TV or other interactive enabling device. An Interactive TV server 103 provides one source of the content to be sold or licensed as is or to be incorporated into other services purchased by an interactive television subscriber 113. The ITV server 103 is a complex which can contains one or more processing units, storage systems and many subsystems such as a library or database subsystem application processing subsystem, control subsystem and a network access subsystem.

Although FIG. 1(a) depicts only one ITV Server 103, in practice many ITV servers will be available to the ITV distribution node 107. The distribution node 107 may manage the various different Audio-Visual Materials (AVMs) provided from various ITV providers and provided appropriate management, resource allocation, setup protocols, and bandwidth management to enable AVMs to be communicated to the home stations and to manage upstream bandwidth from home stations to the video distribution mode. The ITV servers may operate on a regional or national or international levels. The ITV distribution node 107 may have one or more ITV servers 103 co-located or dedicated to the ITV distribution node or the ITV server 103 may service one or more ITV distribution nodes.

The interactive multimedia services available from the ITV Server 103 will be distributed over an ITV backbone Network 105. The ITV backbone network 105 preferably uses the emerging ATM-based wide and metropolitan area networks. The reach of these backbone networks will extend to neighborhoods since most high speed networking equipment is owned by Telephone Companies (TELCO) who have central offices (CO) that are distributed throughout populated areas. For cable systems, a similar picture emerges when the cable head-end is considered as the wide area interface and fiber optic cable distribution is used to distribute data to the neighborhoods. Note that the backbone network may be omitted and all other components or a subset of components may be co-located in a central office or cable headend.

The high speed backbone WAN/MAN must interface to slower networks through controlled points. The networking node between the WAN and the local network is defined as ITV Distribution Node 107. Conceptually, the distribution node 107 provides transport and WAN access functionality from the local network and can be considered as the equivalent of a hub in legacy networks. The ITV distribution node 107 drives the final leg of the network which we will term as the local distribution network (LDN) 109. This network crosses the "last mile" to connect the ITV distribution node 107 to the home station 111. The LDN 107 may consist of a fiber optic network or a coaxial network or some fiber/coax hybrid or any other communications media. The LDN 107 can be a traditional terrestrial broadcast as a return path is provided over the LDN.

Figure 1B:
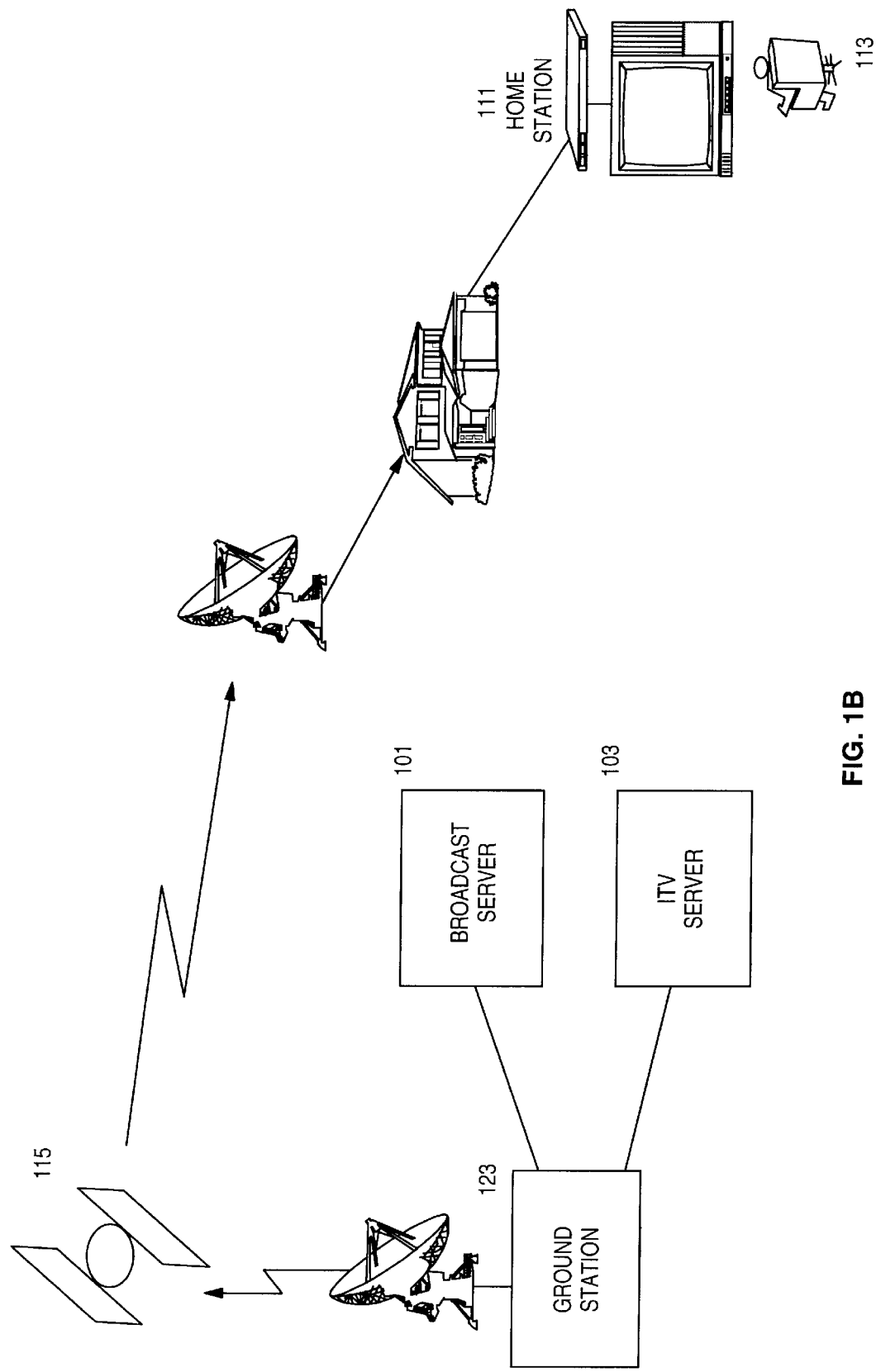
FIG. 1(b) is an overview of an interactive television system using direct tv systems.

FIG. 1(*b*) depicts a ITV distribution system known as direct view TV. This is a satellite distribution system where the home station has a satellite dish and appropriate receiver front end. As far as the present invention is concerned it does not matter how the AVMs are provided to the subscriber.

The home station 111 is the subscriber access point to the interactive television infrastructure. The home station 111 contains a receiver to receive and present the audio-visual materials provided by the service provider complex (i.e., the ITV server, Broadcast Server, ITV or regular broadcasting system Distribution Node). The home station 111 may be embodied in a set-top terminal connected to a television set or a personal computer or a personal computer connected to a television set or a television set equipped with appropriate electronics. The home station 111 receives analog or digital audio or video signals through one or more analog or digital AVM distribution and broadcast networks. The home station 111 permits the subscriber 113 to control the presentation of AVMs. The home station 111 may also provide the subscriber with an interactive capability. The interactive capability allows the subscriber to select AVMs for presentation as well as participate interactively in AVM presentations such as video-on-demand. The home station 111 has the ability to provide information from the home station 111 to the distribution node or behavior collection center. The home station thus has an up-link communications capability or a so-called "reverse channel". The home station 111 may also have an associated hand-held device that a subscriber uses to communicate with the home station 111. The hand-held device may be a simple remote control device as is associated with most settops and TVs or in more sophisticated systems a PDA. The hand held device communicates with the base unit of the home station via infra-red or radio frequency or cable link.

It should be understood that the present invention contains one or more software systems. In this context, a software system is a collection of one or more executable software programs, and one or more storage areas (for example, RAM, ROM, cache, disk, flash memory, PCMCIA, CD-ROM, Server's Memory etc.) In general terms, a software system should be understood to comprise a fully functional software embodiment of a function or collection of functions, which can be added to an existing computer system to provide new function to that computer system. Software systems generally are constructed in a layered fashion. In a layered system, a lowest level software system is usually the computer operating system which enables the hardware to execute software instructions. Additional layers of software systems may provide, for example, database or graphical user interface or window management system capabilities. These software systems provide a foundation on which additional software systems can be built.

A software system is thus understood to be a software implementation of a function which can be assembled in a computer system providing new functionality. Also, in general, the interface provided by one software system to another software system is well-defined. It should be understood in the context of the present invention that delineations between software systems are representative of the preferred implementation. However, the present invention may be implemented using any combination or separation of software or hardware systems.

DETAILED DESCRIPTION OF THE INVENTION

The present invention uses the home stations to collect data on the behavior of subscribers. This data will be used to create a profile of the subscriber to individualize, or more directly target, the marketing of new interactive television products and/or product advertisements. This solution applies to both emerging interactive services and also to existing broadcast services with very minor changes to the broadcast signal. Although the present invention is described below with respect to an ITV system, it may be used with audio only broadcast such as FM radio, cable radio or satellite radio applications. This AVI fields can be used in the transmission of audio signals to determine the popularity of various songs.

In an interactive TV system content providers broadcast (or transmit or deliver) audio-visual materials to subscribers. These audio-visual materials may consist of, but are not limited to, any of the following: Karoke-on-demand (KOD), Games-On-demand (GOD), Movies-On-Demand (MOD), Video-On-Demand (VOD), TV programs on demand (TOD), TV programs provided by one or more of the networks (ABC, CBS, NBC, FOX, CNN, TBS, DIS, etc..), Commercials, Local or Community TV programs, etc. The audio-visual materials may be interactive or non-interactive. These audio-visual materials may be provided to the home stations as all digital signals, analog signals or hybrid analog digital signals. Audio-visual materials may also be thought of as multimedia streams. The streams are then presented to the subscriber. This presentation provides the subscriber with video and audio information. The visual information is presented on a display screen. The audio information is presented via speakers. The signals provided to the home station may be compressed using a compression scheme such as MPEG1 or MPEG2 or some other compression scheme. The signals may be standard analog NTSC signals or High Definition Television (HDTV) or PAL or SECAM. The signals may be scrambled or Digi-Ciphered or encrypted. The signals may combine in any fashion the following: encryption, access control, network protocols, and/or compression. The home station may utilize any encryption, access control scheme, protocols and/or compression or any combination of the foregoing.

The present invention uses several mechanisms which may be implemented in a variety of ways. Two of the mechanisms are as follows: Content coding of the audio-visual materials, and behavior collection and reporting. Content coding of the AVMs permits each of the AVMs to be uniquely identified. In order to properly identify any audio-visual material, including its sub-portions in whatever desired time slice, all audio-visual materials will be encoded with unique, universal codes. The behavior collection and reporting mechanisms use the content coding to determine which AVMs were presented to the subscriber. The content coding information is decoded from the AVM by the home station. Each subscriber activity (such as channel change or AVM stream change, pause, stop, Picture-In-Picture, SWAP, etc.) or a filtered subset will be recorded in either the home station (in the case of viewing broadcast AVM) or in the interactive content providing equipment (for interactive services) such as the ITV server or other intermediate networking facilities such as the ITV distribution node. This information may be collected and correlated with the purchasing behavior of the ITV subscriber, and resold to marketers of ITV services and advertising agencies. The following sections describe these mechanisms in more detail.

Content Coding of the Audio-Visual Material

In the preferred embodiment in order to identify the content of audio-visual material, all audio-visual material will be encoded with a unique Audio-Visual Identifier (AVI). The AVI will be provided at intervals in the audio-visual material. These intervals may be periodic or aperiodic. For instance, if the audio-visual material is a TV sitcom, the AVI for the particular episode with perhaps a particular showing will have a unique AVI. This AVI will be repeatedly encoded a plurality of times during the broadcast of the of the particular episode of the sitcom. The rate of broadcast will depend on the granularity of the information sought to be collected and the available bandwidth in the distribution system. Each audio-visual material may also have sub-portion identifiers. Sub-portion identifiers permit determining frame or scene or segment or sub-portion presentation and provide a finer granularity. Separate sub-portion identifiers may be used for the audio material and the visual material. Sub-portion identifiers can also aid in accurately determining when viewers tuned in or tuned out. The extracted or captured or decoded AVI information is used to determine which, when and what audio-visual materials were presented to the subscriber.

As previously stated, each broadcast of audio-visual material will be embedded with one or more audio-visual identifiers (AVIs). The AVIs may take various forms. In one embodiment the AVI is comprised of a basic field and a set of extensions. In the preferred embodiment shown in FIG. 2, the basic field 201 contains a unique identification number 205 which is similar to the ISBN number for published works or the Universal Product Code (UPC) for consumer goods. The Identification Number 205 uniquely identifies the AVM or is associated with the AVM. One field in the AVI must contain the identification number 205 which is universally defined for each AVM. Given the AVI Identification number 205 a particular AVM can be identified. Note that the AVI identification number does not have to be a number at all but can be an alpha-numeric or character string. The AVI identification number is a unique code that identifies the AVM and may consist of a concatenation of fields such as provider or advertiser or producer codes. The AVI may also contain a time index field 207 as a sub-portion identifier so that specific portions of the AVM are identified as they are presented to the subscriber. As has been previously noted a sub-portion identifier is not required to utilize the present invention. It should also be noted that the preferred embodiment uses a time index field as the sub-portion identifier but, any other type of identifier such as an alpha-numeric characters or string may be used. The sub-portion identifiers should be unique within the AVM. This can be accomplished by using a running time index. In the embodiment depicted in FIG. 2 the time index field is shown as part of the basic field 201. The basic fields, called AVI-B are described in Table I. Note that the Time Index field 207 is only necessary if behavior collection is desired on sub-portions of any given AVM. The time index field 207 may also be utilized in lieu of treating commercials as separate AVMs with separate AVIs however, post processing is necessary along with information on when the commercials were "broadcast" and with the associated time index start and stop times.

TABLE I

AVI Basic Fields (AVI-B)

| Field | Description |
| --- | --- |
| Identification Number | A number or a set of characters or a code that uniquely identifies the audio-visual material. |
| Time Index | Identifies a specific section of the contents. It could be represented as a percentage of the contents that has been delivered or it could be represented as the elapsed time of the contents. By dividing the contents into sections, one can determine how much of the contents a subscriber has viewed or has been presented. |

The time index field may also be useful when commercials are encoded as separate AVMs. For example, if the AVM presented to a subscriber is a TV drama the TV drama would have a unique AVI (i.e., FOX-MRP-0265 for the FOX television network drama Melrose Place episode number 265). If commercials or other AVMs are injected into the broadcast of the TV drama and the commercials have separate AVIs the sequentially received AVI information at the home station could look as shown in Table IV. Thus, from the data it is easy to determine that the TV drama (encoded with the Id number FOX-MRP-0265 representing the FOX Television network drama Melrose Place episode 0265) was presented to the subscriber from time index 1 to time index 4. The Ford Taurus commercial & the IBM Aptiva commercial were also presented to the subscriber from their respective time index 1 & time index 2. The time index may also be used to save memory in the home station by recording a start and stop index for each AVM. Use of the Time Index permits storing the AVI data as shown in Table V. In Table V there is one entry in the Behavior Collection Table (BCT) for each contiguous portion of the AVM presented to the subscriber. Thus, if a subscriber were to start watching a first AVM presentation and then switch to a second AVM presentation and return to watching the first AVM then two BCT entries would be created for each of the non-contiguous intervals of the first AVM, for each of the contiguous periods of presentation. Table V shows only one entry because the presentation was contiguous with the commercials injected. Any savings in memory will depend on how frequently the subscriber switches AVMs or channels. This transformation may be made in the home station or by post-processing at some other node in the ITV system.

The extension fields (AVI-E) 203 contain other information that may be used to enhance the quality of the collection and reporting or to provide additional information to the subscriber or to the AVM provider or to provide additional features. Content and network providers may supply different extension fields to the home stations with source and distribution related information. The content provider may embed either the basic or extended fields into the content. The network provider may augment the AVI with another extension field to describe the specific network provider. Network provider information may be useful for billing and network management purposes. This augmentation may be performed on-line, as the audio-visual material is broadcast.

The content and network related extension fields are listed in Table II and Table III. Note that not all the fields are required and the extended AVI-E may contain any subset of those fields shown in FIG. 2 or tables I–III. Other fields may also be added as required. For instance a cost field and/or a sponsor field may be added. Note the CRC fields 208, 224 and 229 which allow for the detection of errors.

The RATING 217 and CATEGORY 219 fields as shown in AVI-EC 209 are particularly useful when the home station contains a screening or parental control feature to filter AVM presentations. These fields may be used in conjunction with subscriber inputted information to prevent or modify/alter presentation of an AVM. These fields may be utilized in conjunction with sub-portion identifiers as described below. Separate AVI information for the visual portion and audio portion of AVMs may also be utilized. Thus, objectionable language may be silenced while the video portion is presented. The screener mechanism may work in cooperation with an obscuration mechanism such that when home station determines that AVM are to be screened an obstruction mechanism is invoked to modify or blank the presentation of the AVM. The obstruction mechanism may simply blank the audio-visual material to be screened or obscure it in a way that allows the subscriber to follow the plot but not be presented with the objectionable material. The obstruction mechanism may also prevent presentation of the AVM based on an overall rating of the AVM.

TABLE II

AVI Content Extensions Fields (AVI-EC)

| Field | Description |
|---|---|
| Title | Title of AV material contents |
| Contents type | This identifies whether the contents is a movie, music audio, advertising, shopping, etc. |
| Contents Owner | Identifies contents owner. Examples of contents providers are MGM, Paramount Studio, etc. |
| Rating | Identifies the targeting audience, whether the contents is for general viewing, parental guidance, or restricted, etc. |
| Application category | Identifies the category of applications that an user is requesting Examples of the application category are VOD, near VOD, home shopping, games, etc. |
| Mode | This identifies actions that may be taken by the viewer. An example could be the users feedback of the contents |

TABLE III

AVI Distribution Extension Fields (AVI-ED)

| Field | Description |
|---|---|
| Distribution Node location | This identifies the zip code of the local distribution node |
| Network Provider ID | Identification of the network provider. Examples of the network providers are the Bell operating companies, cable companies, etc. |

TABLE IV

| AVI ID Number | Time Index |
|---|---|
| FOX-MRP-22265 | 1 |
| FOX-MRP-22265 | 2 |
| FRD-TAURUS-7685 | 1 |
| FRD-TAURUS-7685 | 2 |
| IBM-Aptiva-032 | 1 |
| IBM-Aptiva-032 | 2 |
| FOX-MRP-22265 | 3 |
| FOX-MRP-22265 | 4 |

TABLE V

| AVI ID Number | Start Index | Stop Index |
|---|---|---|
| FOX-MRP-22265 | 1 | 4 |
| FRD-TAURUS-7685 | 1 | 2 |
| IBM-Aptiva-032 | 1 | 2 |
| SURFING | 10:51:22 | 11:01:10 |
| CHANNEL 6 | 11:01:11 | 11:59:09 |

TABLE VI

| AVI Id Number | Title | Description | Rating |
|---|---|---|---|
| PARA-MOV0231 | Star Trek Generations | Science Fiction takes place in the twenty third century starring . . . | PG |
| DIS-MOV0065 | Lion King | Childerns cartoon starring . . . | G |
| DIS-MOV0054 | Aladdin | Childerns cartoon . . . | G |

TABLE VII

| Identification Number | Time Index | Description | Rating |
|---|---|---|---|
| UNI-MOV0231 | 12 | Opening Ocean scene | G |
| UNI-MOV0231 | 13 | Cruise Liner on the Ocean | G |
| UNI-MOV0231 | 14 | Cocktail Lounge | PG |
| UNI-MOV0231 | 15 | Bedroom scene | R |

AVI Encoding Mechanism

Figure 2:
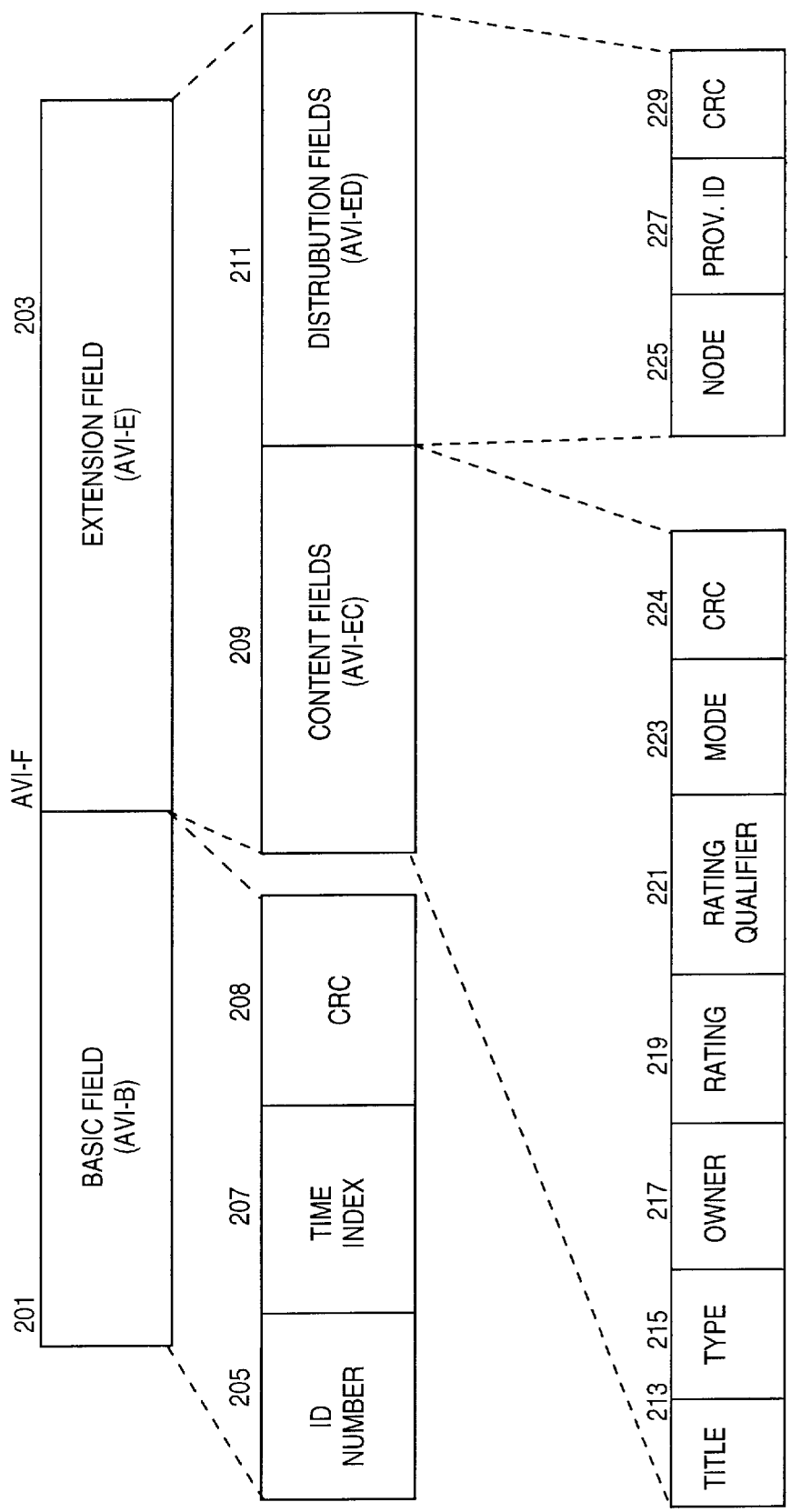
FIG. 2 demonstrates several embodiments of an audio-visual identifier (AVI).
Figure 3:
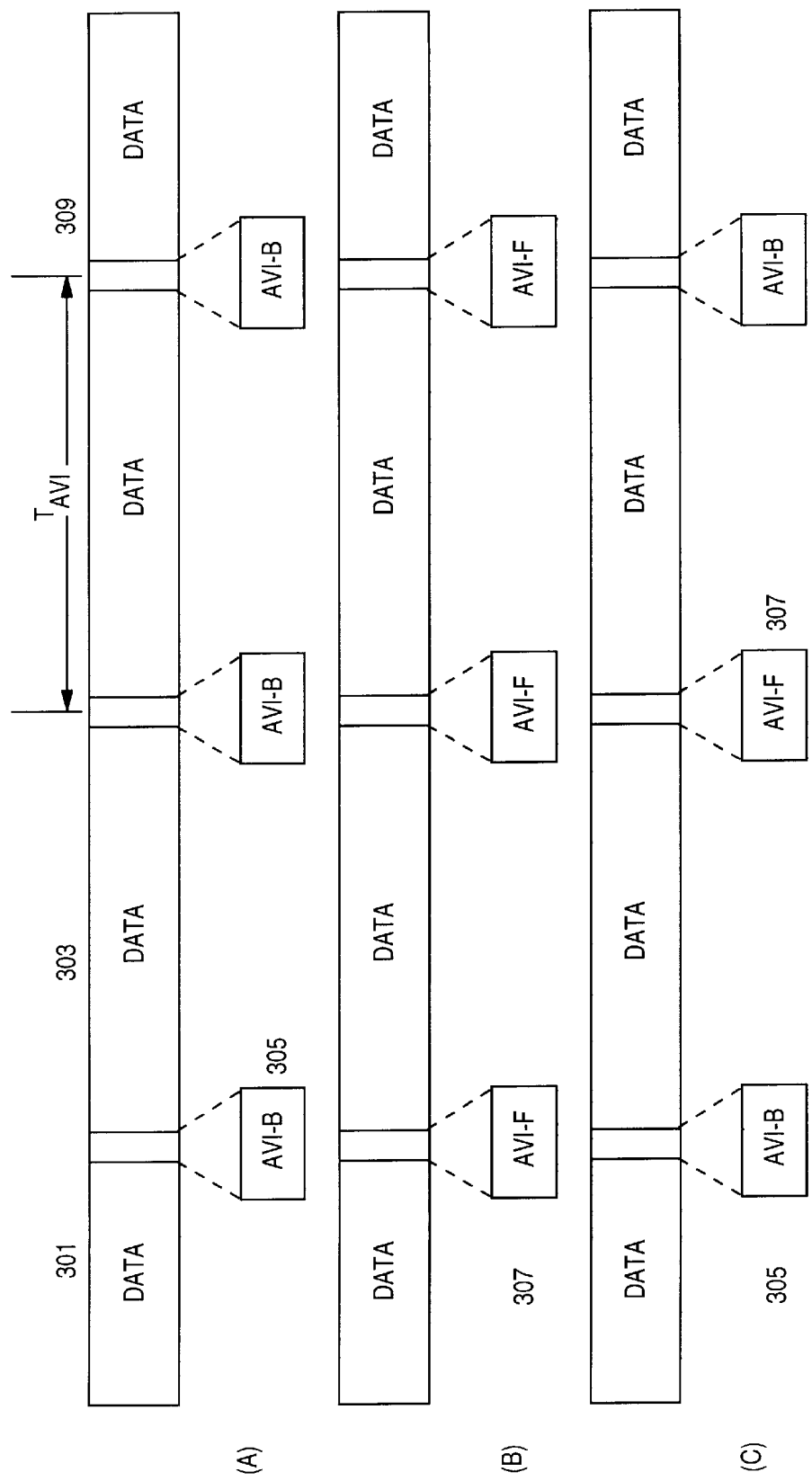
FIG. 3 demonstrates several embodiments of embedding the audio-visual identifier in an audio-visual material data stream.

AVI information may pre-embedded in the AVM or integrated on the fly as the AVM is broadcast or the AVI information may be partially pre-embedded and partially embedded on the fly. For instance, the AVI information may embedded in a VCR Tape and information obtained from the tape can be collected and reported by the home station. Various fields of the AVI may also be updated as the AVI information makes it way towards the home station in a ITV system. The combination of basic and the extension fields forms the fulll AVI, called AVI-F. The AVI-F fields are shown in FIG. 2. All audio visual material broadcasts, for which behavior collection is desired, will include some form of an AVI. The AVI may be the basic or the extended universal or full AVI or some other subset of fields provided at periodic intervals or as the AVM necessitates. For digital broadcasts, the information can be coded at very frequent intervals (e.g. typically less than 100 milliseconds). For analog broadcasts, the bandwidth of the out-of-band signals (i.e., the Vertical Blanking Interval) will determine the code insertion period and whether the basic or extended code is inserted. The inserted code need not be the same in each period, only AVI-B, only AVI-F or a combination of AVI-B and AVI-F fields may be embedded into the content, as shown in FIG. 3. Note that the period between AVI transmission may also vary and change as the AVM necessitates. Thus, for instance AVI information containing rating information may be provided as required by a change in the rating of the content provided.

FIG. 3 depicts several embodiments for embedding the AVI identifier and associated information in a single AVI presentation for the subscriber. FIG. 3 also shows a timing relationship between successive arrivals of AVIs in the AVM. AVI specifications will require the transmission of at least a basic AVI every $T_{AVI}$ seconds. The maximum value for $T_{AVI}$ should be 100 milliseconds. AVI-E fields may be sent less frequently since they provide information that does not change as rapidly. The value for $T_{AVI}$ must be declared across the system since all receiving stations may use the same value to determine when AVI information is not available in a channel or AVM stream. The $T_{AVI}$ threshold may be dynamically controlled by an upstream node as described below. Each of the plurality of AVMs that are provided to the home station would have the AVI embedded in their respective AVM data streams (or least those for which behavior and monitoring is desired). FIG. 3 shows three separate embodiments for embedding the AVI in a single AVM stream. FIG. 3(a) depicts periodically embedding only the AVI-B Codes. FIG. 3(b) depicts periodically embedding the AVI-F codes. Note that the AVI-F requires more data and thus more bandwidth. FIG. 3(c) depicts alternating AVI-B and AVI-F codes so that some of the extended collection information is captured, but with less bandwidth then required by the inserting the full AVI-F codes as shown in FIG. 3(a). Other variations are also possible. The particular scheme used for a given ITV system will depend on the granularity desired, bandwidth available and modulation or transmission scheme. Since a plurality of AVMs are provided to the home station it should also be pointed out that different AVM streams may use different AVI schemes. For example, a cable head end may supply all three of the schemes shown in FIG. 3 on separate channels or within the same channel at different times.

Behavior Collection and Reporting Overview

Figure 4A:
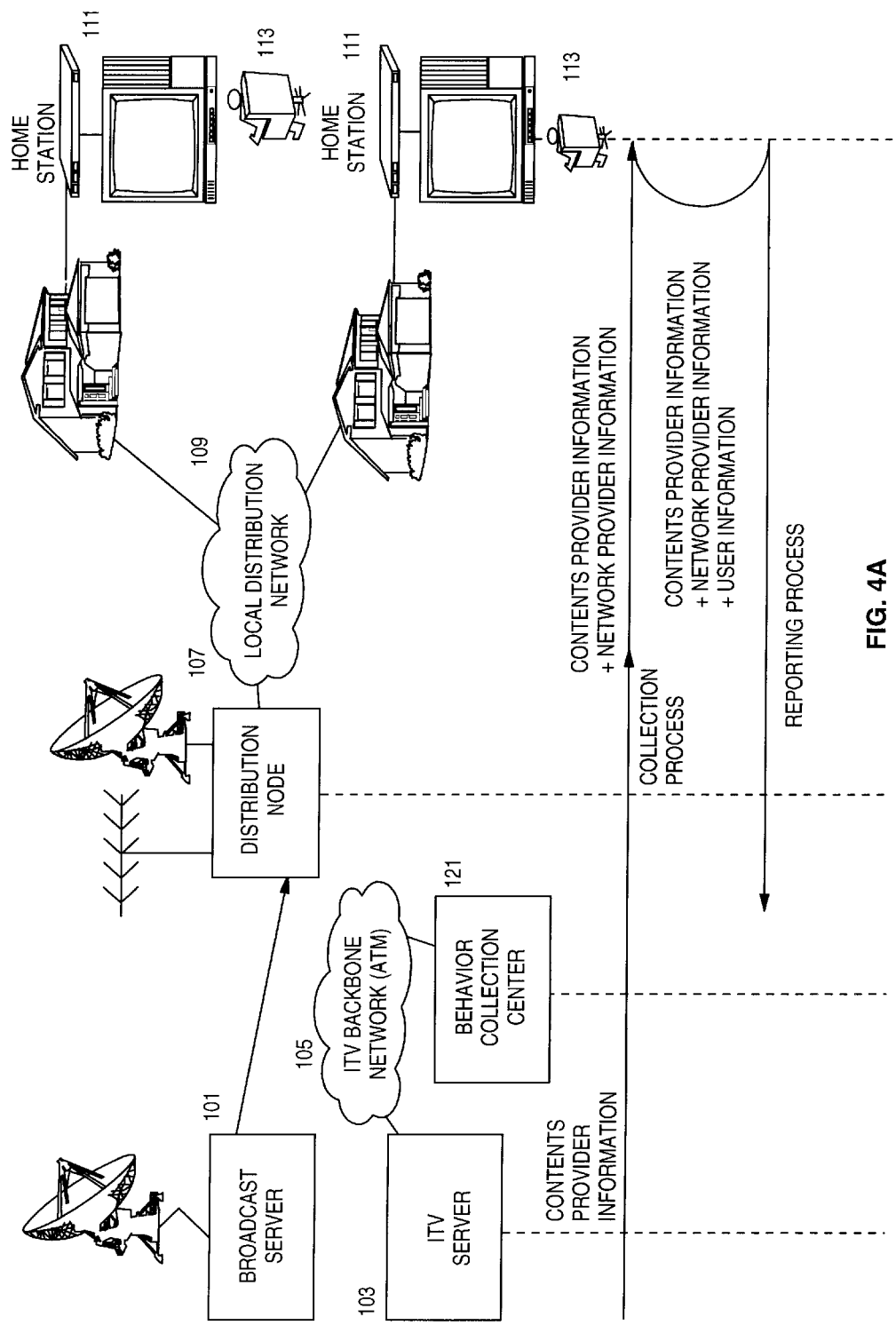
FIG. 4(a) provides an overview of interactive TV system including a behavior collection center and showing an overview of the collection and reporting process.
Figure 4B:
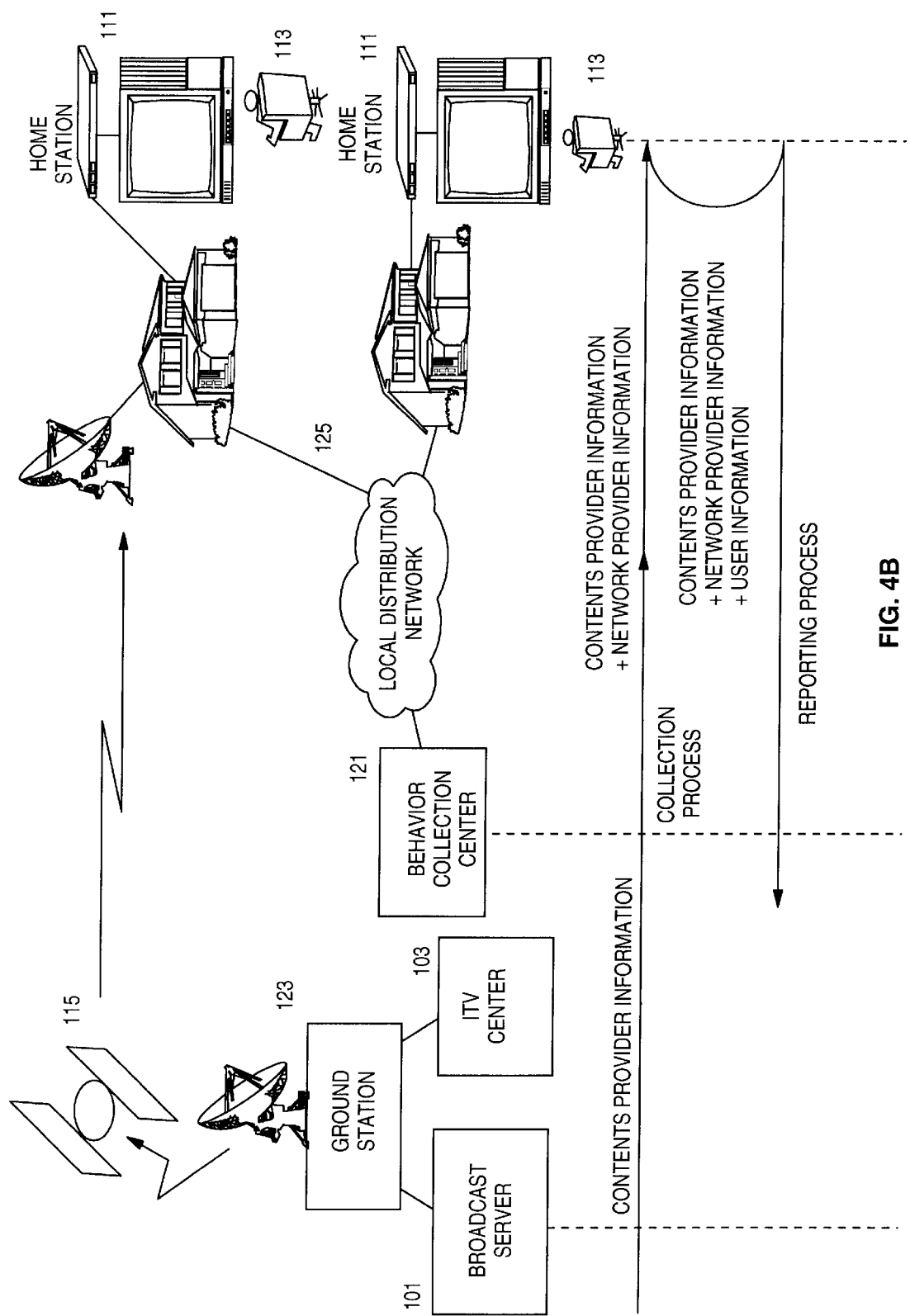
FIG. 4(b) provides an overview of interactive TV system including a behavior collection center and showing an overview of the collection and reporting process with respect to a satellite TV system.

The behavior collection and reporting mechanisms operate to capture subscriber behavior by collecting (i.e., storing and/or transmitting) the AVI information associated with the audio-visual material presented at each subscriber's home station and reporting this information to one or more behavior collection centers. An overview of the collection and reporting process is shown in FIG. 4(a). Note the Behavior Collection Center 121. Although shown attached to ITV Backbone 105 the Behavior Collection Center (BCC) 121 may be located at the ITV server 103, Broadcast server 101, the distribution node 107 or located at one or more of the above. The BCC 121 takes information collected by the various home stations and processes it for the various marketing, broadcast planning, advertising, and AVM provider organizations.

Several BCCs might be used to provide for hierarchal data collection so that information can be collected for appropriate level of advertising (i.e., local, regional, national and international levels). If the BCC is located at several of the ITV elements then information collected at the distribution node DN 107 might be used to determine subscriber behavior for subscribers served by the distribution node 107. The DN 107 or the BCC collocated at the DN 107 may also provide additional information such as a subscriber profile and/or current billing or payment status for the subscriber. The additional information and the collected information is then forwarded to other BCCs. The information collected and processed at the DN 107 might be of particular interest to the DN 107 and local business operating in the geographic area serviced by the distribution node. This permits very effective targeting of subscribers by commercial advertisements. The present invention permits determination of the effectiveness of the ability to customize and inject personalized advertisements into AVMs.

Information collected at a broadcast server 101 or ITV server 103 will typically be based on multiple distribution nodes. This enables a view with a greater population of subscribers from one or more geographical areas. Depending on the particular network these servers may be organized regionally and could thus provide regional subscriber behavior information. The regional servers would provide input to national level BCCs and the national server could provide national subscriber information input to international providers. Thus, each BCC entity in the ITV system may use or store, for its own purposes information flowing through it, and forward the collected information to appropriate BCCs. Various BCCs 121 will collect, collate analyze, process the information and provide it to various advertising agencies, marketing agencies, AV material providers etc. The collected information can then be used to specifically target specified subscribers or groups of subscribers.

Behavior Collection & Reporting Detailed Description

The home station monitors the AVM or AVMs selected by the subscriber for presentation. The home station extracts the AVI information accompanying the AVM(s) selected by the subscriber. Extraction or decoding of the AVI information is based on the physical signal structure of the particular AVM selected. For example, in a AVM using standard NTSC signal format with AVI information encoded in the vertical blanking interval (VBI), the AVI information is extracted from the vertical blanking interval.

The AVI information will be embedded in a plurality of data channels in the various television and audio transmission media. The basic data channel must have features to detect the presence of the channel, and fields to delineate valid AVI codes. One example realization of the AVI code is the closed captioning data present in an NTSC video signal. This signal includes a clock run to indicate the presence of the data channel and framing bits to indicate the start of a data field. With the closed captioning channel, the approximate transmission rate is 480 bits/sec which would allow for a short AVI-B field and less frequent AVI-E fields. In other implementations, such as in an MPEG-2 transport stream, the AVI information can be inserted as private data. The presence of an MPEG-2 transport stream in a data channel can be detected through sync_byte field of the MPEG-2 transport packets. The MPEG-2 transport stream includes error checking information for the whole packet. In this case, the CRC fields of the AVI's will provide supplementary protection.

Extraction of AVI information may be performed and the results buffered until all necessary AVI information can be assembled depending on the available bandwidth in the AVM signal. AVI information may be encoded in scrambled or encrypted format as well. This requires that AVI information be decoded after the descrambling or decrypting.

In the preferred embodiment after extraction, the AVI information is then processed by a software system in the home station. This software system in the preferred embodiment is an event driven software system. The collection process thus responds and processes events as they are generated. For purposes of describing the present invention arrivals of AVI information are treated as events. Other events may be timer events or events initiated by the subscriber. Thus, in the preferred embodiment, the collection process is an event driven process. The actions taken during collection are based on the current event and may in certain circumstances also depend on the present or previous state. Thus, the collection process handles all newly received AVI information and processes the AVI information accordingly. A channel change by the subscriber also generates an event.

Event handling in the home station may result in the writing/reading/update/deletion of information in the behavior collection table (BCT) and/or the transmission of information from the home station to other nodes in the ITV system. Event handling may also result in the modification or blocking of AVM presentations. Events may be initiated in response to receipt of AVI information or may be initiated by a subscriber(i.e., power on, channel change, jump, channel up & channel down, swap, pause, FF, REWIND, OFF, MUTE, RECORD, Picture-In-Picture, etc or any combination of the above). In addition to generating events in certain circumstances the home station responds to events, such as timer events (i.e., no AVI timer and/or surfing filter timer). This response may be to change a state variable, or to record information in the BCT or transmit information or modify the presentation of AVMs in some fashion or any combination of the above.

One method of behavior collection is depicted in FIG. 6. FIG. 5 depicts some of the variables required for behavior collection in the home stations. The method described in FIG. 6(*a*) through FIG. 6(*k*) is based on the behavior collection table depicted in FIG. 10. In step 6001, the home station is activated. This is typically performed by the subscriber turning the home station "ON" but the home station may automatically turn itself on at a preselected time. In step 6001, the home station may select the channel that the home station was tuned to prior to deactivation or the boot up channel or a preprogrammed channel. In step 6003 the home station is initialized and may perform initialization activities required to prepare the home station for behavior collection. These initialization activities may include locating or allocating space in memory for the behavior collection table, initializing variables, preparing for reporting of results, preparing the behavior collection table, determining available memory, and/or the transmission of behavior information previously collected.

FIG. 6(*b*) depicts the initialization procedure of one particular embodiment. The initialization procedure checks if the BCT was not sent prior to a power off event. In step 6011, a check is made to determine if BCT should be transmitted. This check may use the current size of the BCT against a size threshold or a time based parameter (i.e., the collected data is getting old). If the threshold is met or exceeded the BCT is sent. Alternatively, the home station may follow the rule that all BCT information should be transmitted on startup. If the BCT is to be sent then the procedure depicted in FIG. 6(*i*) is carried out. In step 6013 an AVI Timer is started. The AVI Timer allows the home station to determine when a channel is not providing AVI information. The AVI timer is started by setting AVI.Timer= $T_{AVI}$. The timer is started such that after a predetermined time, $T_{AVI}$, the timer will create an event to be serviced by the event handler. The home station also has the state variable AVI.State that indicates the state of the collection process with respect to AVI information. In step 6014 this variable is set to AVI.State=NO_AVI. This indicates that no AVI information has been received in the current timer interval. Note that both AVI.Timer and AVI.State are described in FIG. 5. The initialization routine is returned to the main loop in step 6015.

Figure 6A:
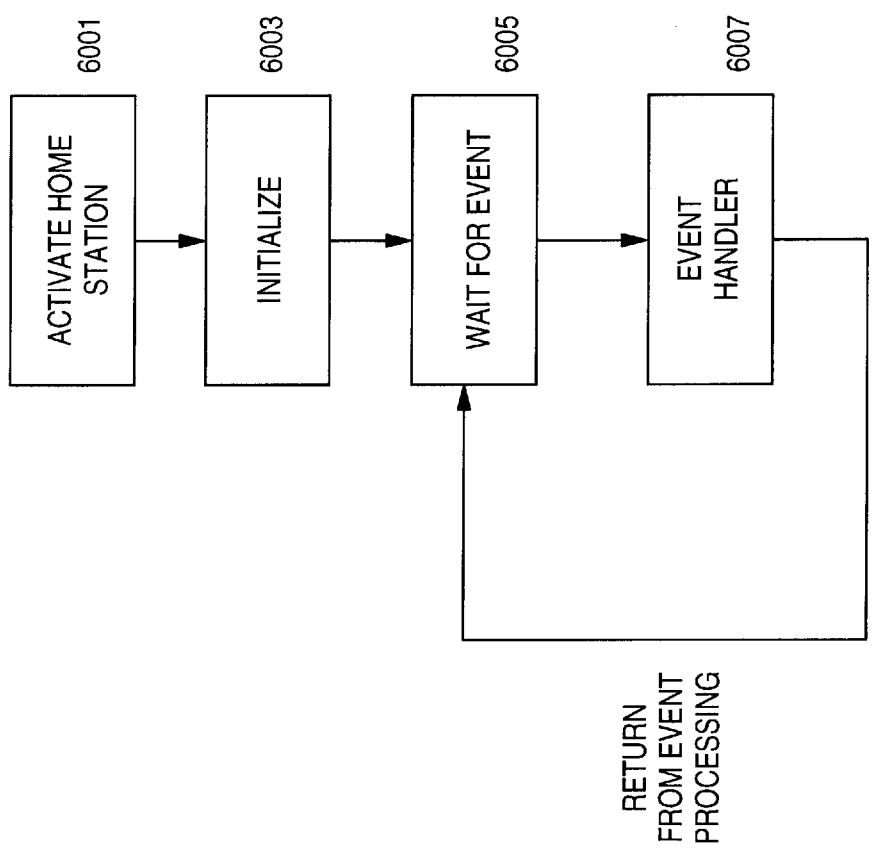
FIG. 6(a) provides overview of an event driven embodiment of the collection process in the home station.
Figure 6B:
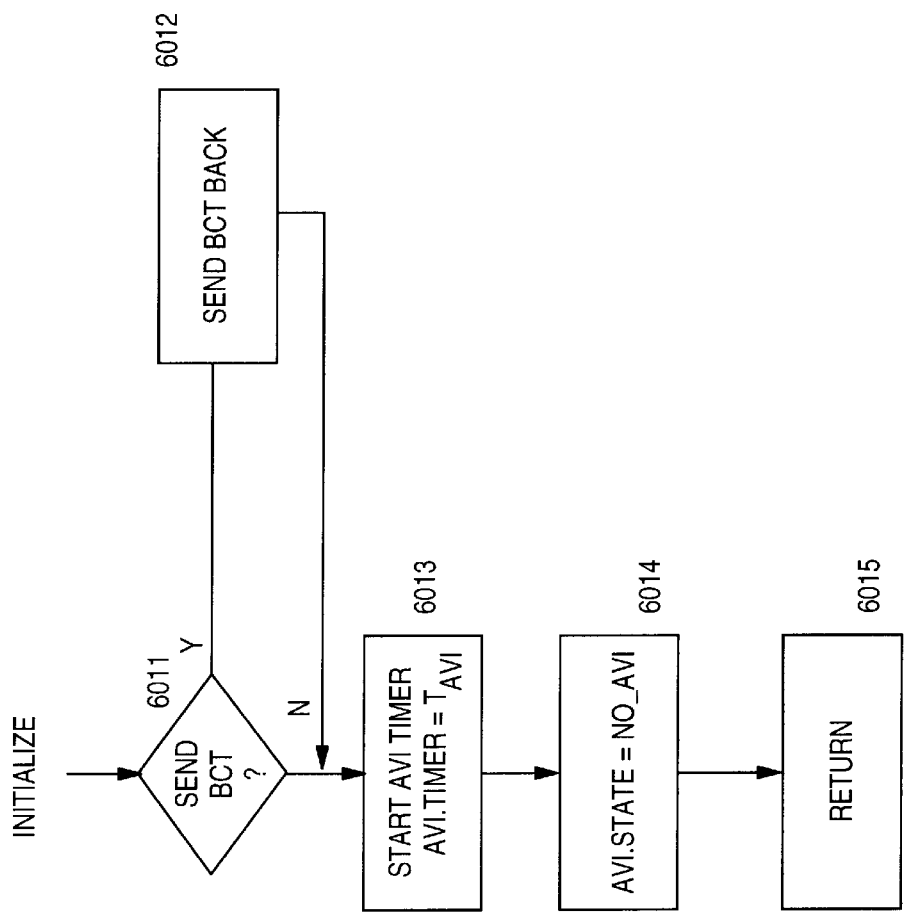
FIG. 6(b) provides the initialization sequence for an event driven collection process FIG. 6(c) provides the collection process response to a channel change event.

After the behavior collection variables are initialized as discussed in the initialization procedure, the home station enters a wait for event state as shown in FIG. 6(a), step 6005. In step 6005 the home station is waiting for an event. The home station waits for events in step 6005 and when an event is generated it identifies the appropriate event handling procedure to process the event. For instance when AVI information is decoded it generates an event the wait event step process determines that the AVI arrival event handler should process the event. The newly received AVI information is provided to the AVI arrival event handler and is executed to process the AVI arrival event. When the subscriber changes channels a channel change event is generated and processed accordingly. Note that with advent of Picture-in picture multiple AVMs may be presented to the subscriber at the same time. Multiple presentation of AVMs requires that the home station or an attached device and the home station have the capability for multiple tuners or multiple channels.

Step 6005 receives events and causes the execution of appropriate procedures or processes to handle the events as generated. Step 6007 executes the event handler for the specific type of event. The event handlers and associated procedures will be discussed herein. Events may be queued for execution with higher priority events executed first. Events may also be processed on a first come first served basis. In this particular embodiment in step 6005, the home station is waiting for one of several types of events: a channel change event, an AVI arrival event, a power off event, a timer countdown event or a received command event. These will be described in turn. Each event has its own event handler as shown respectively in FIGS. 6(c), 6(d), 6(e), 6(h) and 6(j) in step 6007 of FIG. 6(a).

Figure 6C:
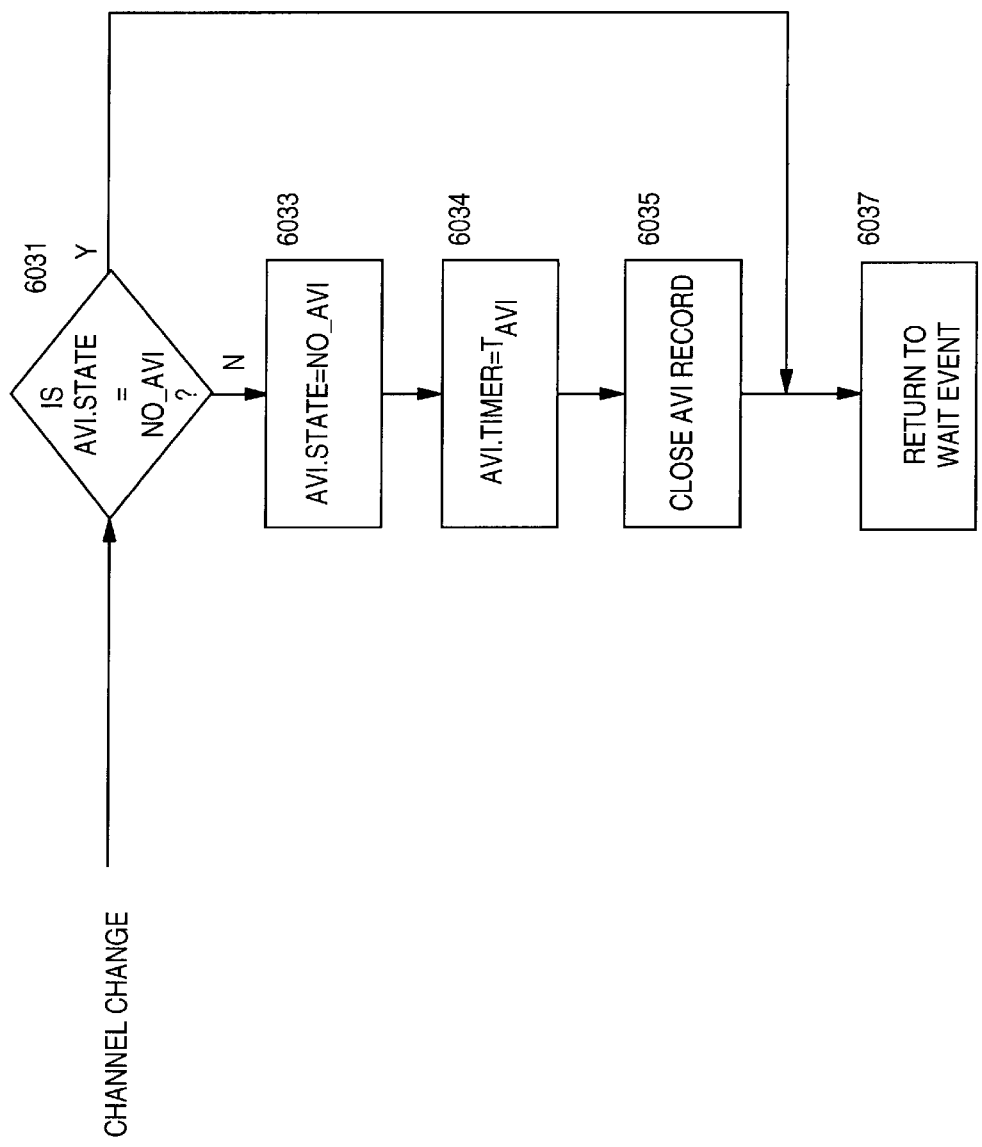
FIG. 6(d) shows the collection process response to the arrival of AVI information.
FIG. 6(e) shows the collection process response to a power off event.
FIG. 6(f) shows the open AVI record procedure.
FIG. 6(g) shows the close AVI record procedure.
FIG. 6(h) shows the AVI timer countdown complete event.
FIG. 6(i) shows the Send BCT procedure.
FIG. 6(j) shows the collection process response to a received command.

When a channel change event occurs as a result of a subscriber changing channels, the event is handled as shown in FIG. 6(c). The channel change event may be detected by input from the remote or a controller or a channel changer. In response to a channel change event, the channel change event handling procedure checks the AVI.State variable in Step 6031. If the AVI.State=NO_AVI, indicating that there has been no AVI information received in the current $T_{AVI}$ period, then the channel changer event simply returns to the wait event state as shown in step 6037. However, if the AVI.State≠NO_AVI then AVI.State=NO_AVI in step 6033. This indicates that no AVI information has been received on the new channel. In step 6034 an AVI Timer is started. The AVI Timer allows the home station to determine when a channel is not providing AVI information. The AVI timer is started by setting AVI.Timer=$T_{AVI}$. After a predetermined time, $T_{AVI}$, the timer will create an event to be serviced by the event handler provided the timer is not reinitialized. In step 6035, we close the any BCT record associated with the previous channel. The procedure knows that there is an open BCT record because the AVI.State≠NO_AVI by virtue of step 6031 in this branch of the channel change event handler. Step 6037 returns to the wait for event state.

Figure 6D:
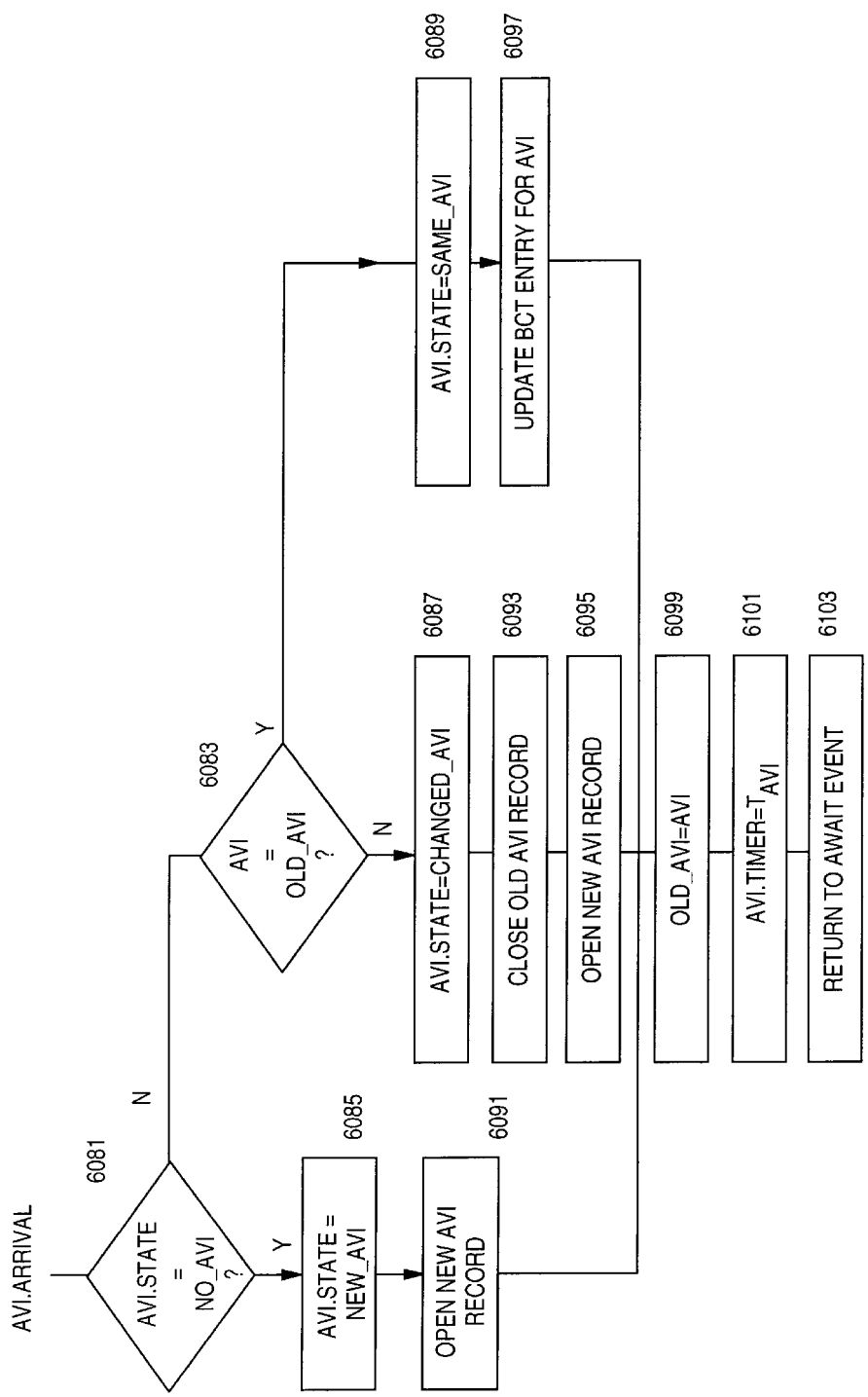

If in the wait for event step 6005 an AVI is detected or the arrival of an AVI is detected, the AVI arrival is processed by the AVI arrival event handler. The AVI arrival event handler is shown in FIG. 6(d). The processing of AVI information can result in the generation of other events (i.e., transmission events, screener events, etc.) and/or kick off other processing. In the AVI arrival event handler, it is first determined if AVI.State=NO_AVI. This is shown in step 6081. If the AVI.State=NO_AVI, then in step 6085 AVI.State=New_AVI indicating that the home station has received an AVI and where it had previously not received one in the previous time period. Note that as it is used this discussion, AVI is referring in particular to the AVI identification number. Proceeding to step 6091, an new BCT entry is created using the newly received AVI identification number. Returning now to step 6081, if the AVI.State≠NO_AVI then in step 6083 a comparison is made between the AVI identification number of the AVI generating the current event and the OLD_AVI identification number. The OLD_AVI is the previous AVI identification number that was used in processing the previous AVI arrival event (see Step 6099). If the newly-received AVI identification number does not equal the OLD_AVI identification number, then steps 6087, 6093 and 6095 are carried out. In step 6087, AVI.State=CHANGED_AVI. In step 6093 any open BCT records are closed in the BCT table (the entry in the BCT table associated with the OLD_AVI). In step 6095 a new entry is created in the BCT for the newly arrived AVI Identification number. Returning to step 6083, if the newly-received AVI equals the previously-received AVI or if the AVI equals the old AVI, then in step 6089, AVI.State=SAME_AVI and in step 6097, the BCT entry for that particular AVI is updated. In addition to updating the BCT entries, information may also be provided to other processes in the home station. For instance, rating information may be provided to a screening function (i.e., parental control functions). Processing of other fields that are associated with the AVI information (some of the extended fields that have been discussed previously) may be provided to other functions. With any AVI arrival, steps 6099, 6101 and 6103 are performed. In step 6099, we set the OLD_AVI equal to the newly-received AVI identification number. In step 6101 the AVI timer is reset, AVI.Timer=$T_{AVI}$, in step 6103 returns to await or process other events.

Figure 6E:
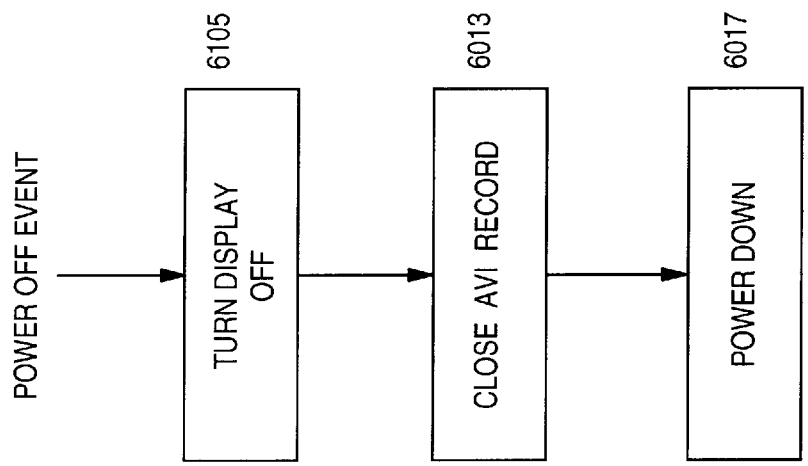

Another type of event that may be handled by the handler is a power off event. Power off event may result from a power outage or from a subscriber shutting off the home station typically using the remote. The event handler for a power off event is shown in FIG. 6(e) wherein step 6105 the display or presentation mediums are turned off. This is an optionally step that provides the subscriber with feedback to the power off event. In step 6013 any opened AVI records are closed. Although not shown, an additional step may send the entire BCT table upstream. The entire BCT may be sent back in accordance with the send BCT back procedure discussed herein. The home station is then powered down in step 6017. In alternative embodiments, the power off event may simply save the BCT table to non-volatile memory such as a flash memory, such that on the next power up, the BCT table might be sent. The power off event processing procedure may also perform other house keeping tasks for the home station.

Another event that may occur in the wait for event step 6005 is the AVI timer complete event. The AVI timer complete event handling is shown in FIG. 6(h). In step 6191, AVI.State=NO_AVI indicating that no AVI information was available. In step 6193, the current AVI is cleared. This may be done simply by setting the old AVI equal to null (i.e, OLDAVI=Null) or some other variable. In step 6193, returns to process or await other events.

Figure 6F:
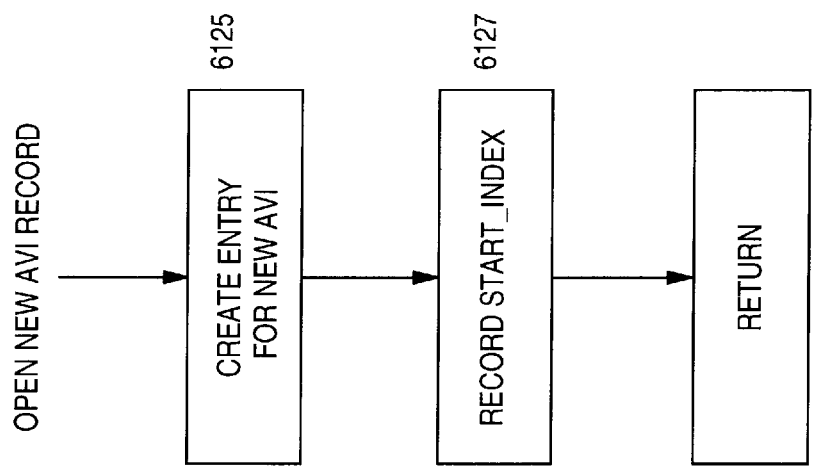

FIG. 6(f) shows the open new AVI record procedure (create new BCT entry). Step 6125, creates an entry for the newly received AVI Identification Number. Step 6127, records the start index in the newly-created entry. A more sophisticated technique may be used to account for the fact contiguous showing of a TV programs may have commercials shown using different AVI Identification numbers as discussed previously.

Figure 6G:
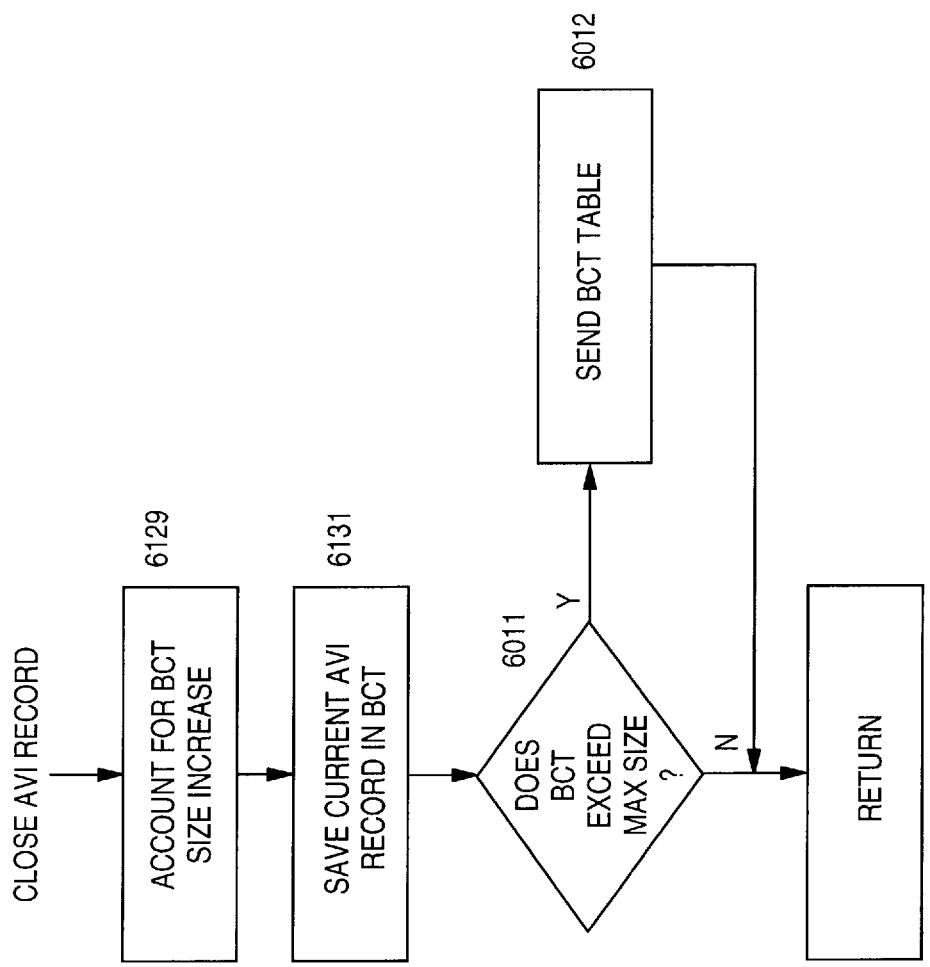
Figure 6H:
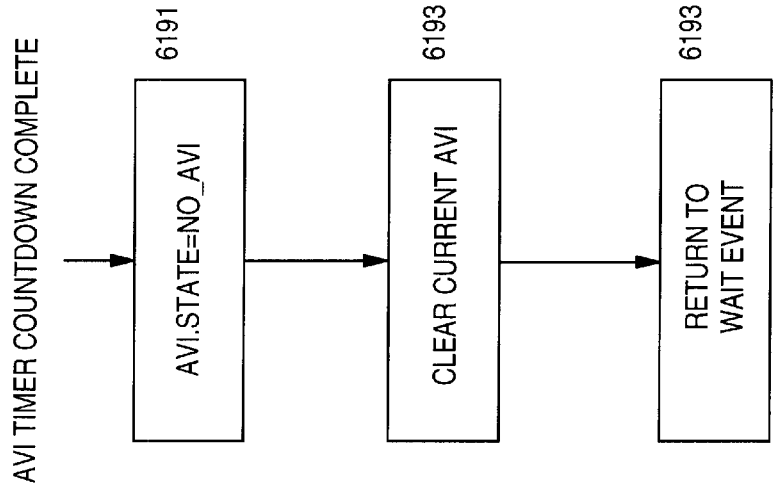
Figure 61:
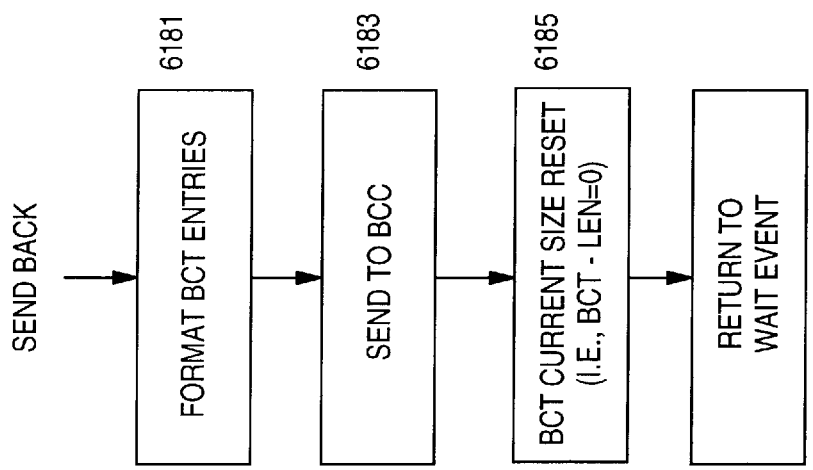

The close AVI record procedure is shown in FIG. 6(g). In step 6129, the procedure accounts for the size increase. This may simply provide a length counter increment for the behavior collection table. In step 6131 the current AVI record is saved or closed in the BCT. Steps 6011 and 6012 demonstrate another feature of the invention where, if BCT records are not transmitted on the fly, then there is the ability to transmit the BCT table when it reaches a predetermined threshold size. This threshold can be based on memory capacity. In step 6011, the BCT is checked to determine if the BCT size or the number of entries in the BCT table have exceeded a predetermined BCT maximum threshold. If the threshold is exceeded, then the send BCT table back procedure is invoked in step 6012. Otherwise, control is transferred back to await or process other events. Note that the closed AVI record procedure as defined in FIG. 6(f) assumes that the home station only sends the BCT table when the home station is powered up, powered off or when the BCT table exceeds a certain size. However, an alternative embodiment is to send BCT records back on the fly. Thus, whenever an AVI record is closed, we would also transmit back that particular entry to the behavior collection center.

Figure 14:
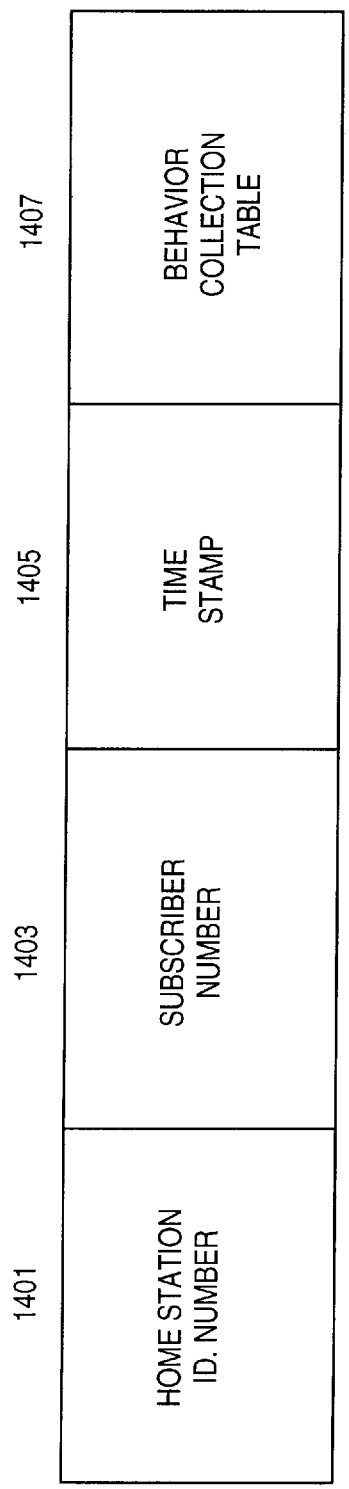
FIG. 14 shows a logical view of the data to be provided to the behavior collection information center.

The Send BCT information back procedure is described in FIG. 6(i). The BCT entry or entries are formatted in step 6181. Step 6181 can involve compression, packetization, error correction codes and/or encryption. Step 6181 may also involve extracting relevant information from the BCT. Thus, if title information were obtained from the AVI it does not need to be sent because the associated AVI identification number can be used to identify the title at the BCC. FIG. 14 depicts some additional information that may be included with the BCT information. Thus, Home Station Identification number 1401 which may be found in memory of the home station, the Subscriber number 1403 which may be the subscriber account number or the identity of the particular subscriber in the household, a time stamp 1405 for indicating when the BCT information was transmitted, and the appropriate entries from the BCT 1407. Any combination of these fields may be sent. Transmission of the BCT or a BCT entry is shown in 6183. Transmission involves adapting the data to be sent to the communications medium and protocol desired. A cable modem may be utilized to send information upstream. Depending on the number of BCT entries to be sent and the modem speed, a background transmission process may be started to provide information to the upstream node (i.e, the BCC). Any of a number of communications protocols may be utilized. In step 6185, the BCT is updated to reflect that BCT information was transmitted. This may entail deletion of entries sent and or updating a state variable or size and time variable updates. Note that if error detection and correction is desired, step 6185 will not commit the BCT data until successful transmission has occurred. There are a wide variety of techniques for maintaining the integrity of the data until successful transmission. Control is then returned to the procedure that requested transmission of the BCT.

The collected data table may be reported to the BCC on the fly (i.e., as the information is created) that is as the table entries are made or periodically or as requested by the BCC when the data table is nearing full or some combination of the above. The data table may also be queried at any time by the BCC. The BCC may send a Send data command to the home station requesting that it send BCT data. When reported, the data table is appended with several other subscriber related fields. FIG. 14 shows a logical view of the information each home station provides to the BCC. As shown in FIG. 14, these fields may consist of the following HOME STATION IDENTIFICATION NUMBER 1401, HOME STATION SUBSCRIBER (i.e., CUSTOMER ID) 1403, TIME-STAMP 1405 the time stamp 1405 defines when the data was assembled for transmission to the distribution node. The collected data table or portion thereof is shown as block 1407. This information may be packetized, compressed, encrypted or any or none of the foregoing. The resultant data is sent back to the BCC by the home station via the reverse or upstream channel.

Figure 6J:
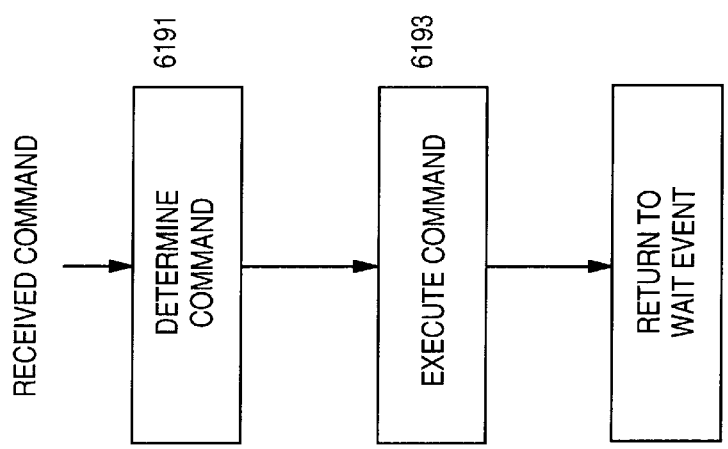

FIG. 6(j) depicts the response to a command received from an upstream node. The command may cause the home station to change variable parameters such as $T_{AVI}$, $T_{SURF}$, enable or disable home station features such as a surfing filter, send BCT data upstream, reset or any other home station operation. The command may also cause the home station to present a message to the subscriber. The home station response will depend on the command set and data sent with the command. FIG. 6(j) step 6191 the particular command is determined from the command set and in step 6193 the command is executed. Thus, for the case of a send BCT table command the send command is determined in step 6191 and in step 6193 the send BCT procedure is invoked. Note that the home station may respond to a command to update the software on the home station. This can be accomplished by the home station in response to a such a command executing a special program which might tune the home station to a particular channel and start downloading the new software system. The downloaded system would then be installed in the home station.

Channel Surfing Filter

FIGS. 7 and 8 will now be used to illustrate an alternative embodiment that includes a channel surfing filter. FIG. 7 depicts some of the variables required for behavior collection in the home station when implementing the channel surfing filter. Note the addition of the Surf Timer and the Surf State variable. As with the embodiment discussed with respect to FIGS. 5 and 6, the basic event handling scheme is still utilized. The processing for each event varies as described herein.

Figure 8A:
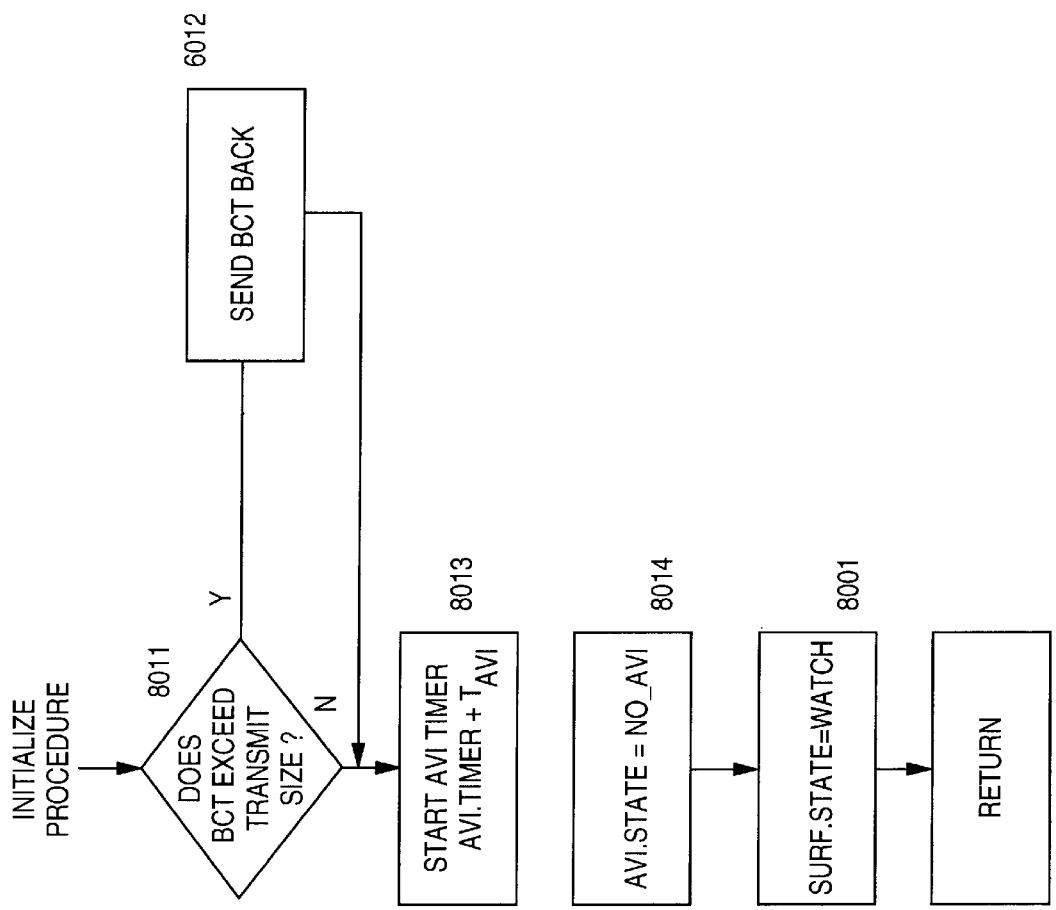
FIG. 8(a) provides the initialization sequence for an event driven collection process with channel surfing filter.

FIG. 8(a) depicts an initialization procedure required for behavior collection with the channel surfing filter embodiment. In step 8011, the initialization procedure checks to determine if the BCT should be sent upstream, in case the BCT was not sent prior to a power off event. This check may use the current size of the BCT against a size threshold or a time based parameter (i.e., the collected data is getting old). If the threshold is met or exceeded the BCT is sent. Alternatively, the home station may follow the rule that all BCT information should be transmitted on startup. If the BCT is to be sent then the procedure depicted in FIG. 6(i) is carried out. In step 8013 an AVI Timer is started. The AVI Timer allows the home station to determine when a channel is not providing AVI information. The AVI timer is started by setting AVI.Timer=$T_{AVI}$. The timer is started such that after a predetermined time, $T_{AVI}$, the timer will create an event to be serviced by the event handler. The home station also has the state variable AVI.State that indicates the state of the collection process with respect to AVI information. In step 8014 this variable is set to AVI.State=NO_AVI. This indicates that no AVI information has been received in the current AVI timer interval. Note that both AVI.Timer and AVI.State are described in FIG. 7. In step 8001, SURF.STATE=WATCH. Thus, the initial presumed state as the home station at initialization is WATCH or the no channel surfing state. The initialization procedure then returns to the wait or process next event state.

Figure 8B:
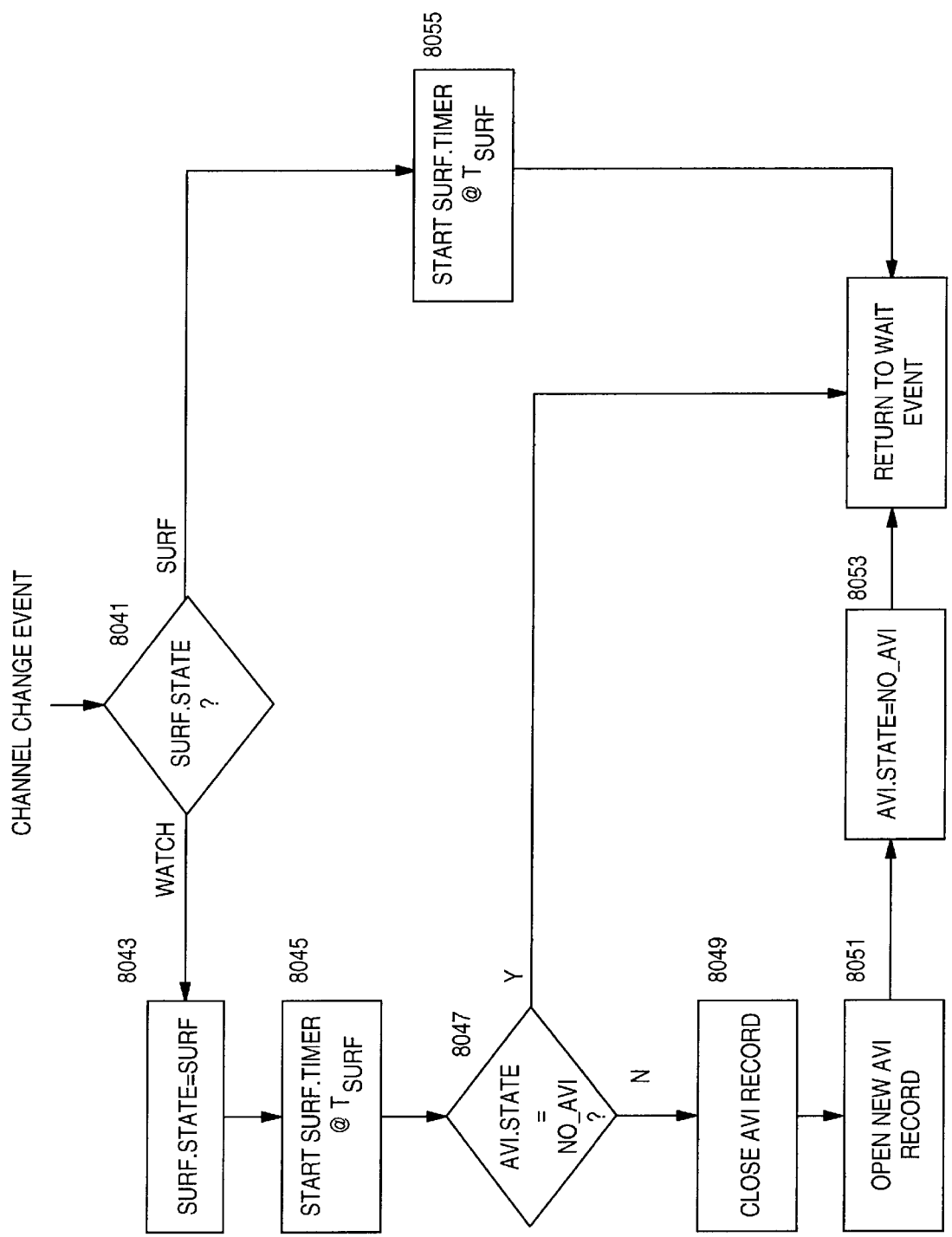
FIG. 8(b) provides the collection process in response to a channel change event with channel surfing filter.

FIG. 8(b) depicts the home station's response to a channel change event when the channel surfing filter is enabled. In step 8041 the SURF.STATE is checked to determine whether the SURF.STATE is SURF or WATCH. If the SURF.STATE=WATCH, then in step 8043 SURF.STATE= SURF thus changing the state from watch to surf. Thus, after a channel change the presumed surf state is surfing. In step 8045 the surf timer is started and initialized to a value of $T_{SURF}$. Thus, a timer event will be generated after a $T_{SURF}$ time period. Note in the preferred embodiment $T_{SURF} > T_{AVI}$. $T_{SURF}$ is the amount of time in which a subscriber is tuned to a particular channel in order to be considered as watching the AVM(s) on the channel or not to be surfing. After starting the surf timer, the AVI.STATE is checked in step 8047. If the AVI.STATE=NO_AVI, then we return to the main processing to process other events or await other events. If, however, the AVI.STATE≠NO_AVI, then the existing AVI record is closed in step 8049 and a new BCT entry is created with the new AVI in step 8051, and the AVI.STATE=NO_ AVI in step 8053 and control returns to the wait event state of the main event handling loop. Returning to step 8041, if SURF.STATE=SURF, then in step 8055 the SURF timer is reinitialized to a value of $T_{SURF}$ (i.e., SURF.TIMER= $T_{SURF}$). Thus, the SURF.STATE remains in the SURF- .STATE until the timer should expire unless, of course, another channel change event is detected wherein the SURF timer will, of course, be re-initialized or restarted. After reinitialzing the surf timer the initialization procedure returns to the main wait event handling routine.

Figure 8C:
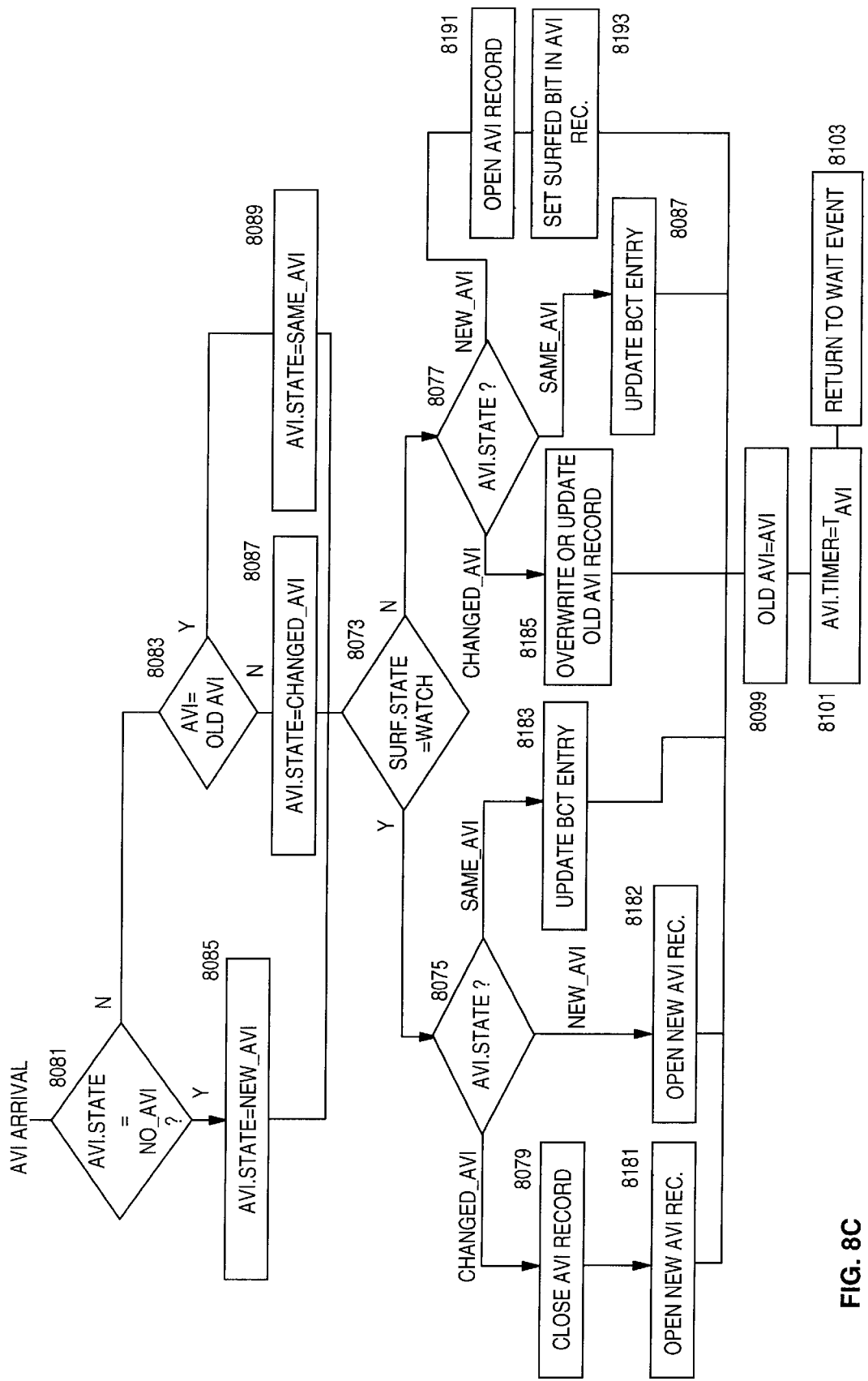
FIG. 8(c) shows the collection process response to the arrival of AVI information with channel surfing filter.

FIG. 8(c) depicts the processing performed by the home station in response to an AVI arrival event with the Channel Surfing Filter enabled. In step 8081 the AVI.STATE is checked. If the AVI.STATE=NO_AVI, then in step 8085 AVI.STATE=NEW_AVI. If, however, in step 8081, AVI.STATE≠NO_AVI, then in step 8083 the home station compares the existing AVI to the previous received AVI or the old AVI. If these two are equal, then AVI.STATE= SAME_AVI in step 8089. If, however, the AVI is not equal to the old AVI, then in step 8087, AVI.STATE= CHANGED_AVI. Having set the AVI.STATE variable either in step 8085, 8087 or 8089, then in step 8073 the SURF.STATE is checked. If the SURF.STATE=WATCH indicating that channel surfing has not been established, then in step 8075 based on the AVI.STATE certain procedures are performed. If the AVI.STATE=CHANGED_AVI, then in step 8079 any BCT with the previous AVI is closed. In step 8181 a BCT entry is created with the newly received AVI. If, however, in step 8075 the AVI.State=NEW_AVI, then in step 8182 a BCT entry is created for the newly received AVI. If in step 8075 the AVI.STATE=SAME_AVI, then in step 8183 the BCT entry for that particular AVI is updated (i.e., the time index is updated) Other steps may be performed as well especially with processing for other AVI fields as described below. Returning now to step 8073, if the SURF.STATE≠WATCH, in other words, if the SURF.STATE=SURF, then in step 8077 for each of the AVI.STATEs processing may differ. If the AVI.STATE= CHANGED, the old AVI record is overwritten or updated in step 8185. If the AVI.STATE=SAME, then in step 8187, the BCT entry is updated accordingly. If, however, the AVI.STATE=NEW_AVI, then a new BCT entry is created with the new AVI in step 8191, and in step 8193 the surf bit in the AVI record is set. This particular implementation assumes the BCT table structure as depicted in FIG. 11. Regardless of whether the SURF.STATE is WATCH or SURF or what particular state the AVI.STATE variable is in, in step 8099 we set the OLD AVI equal to the current AVI and we reset the AVI.timer=$T_{AVI}$ in step 8101 and return to the wait event handling state of the main routine.

Figure 8D:
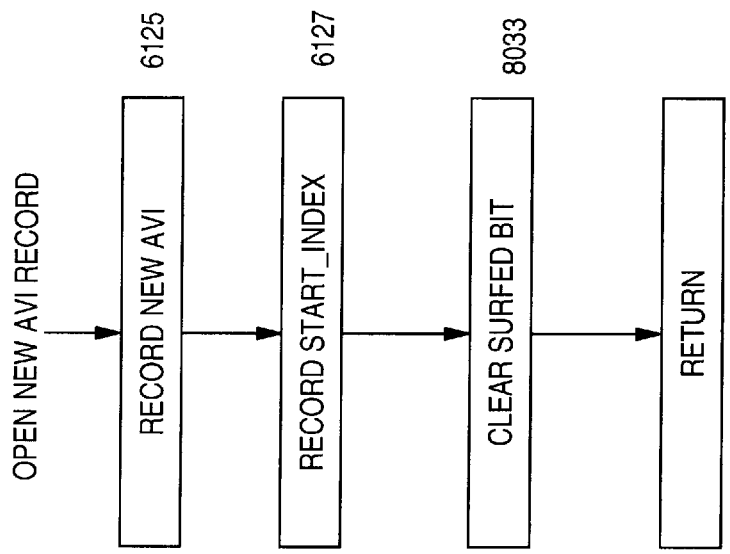
FIG. 8(d) shows the open AVI record procedure with channel surfing filter.
Figure 8E:
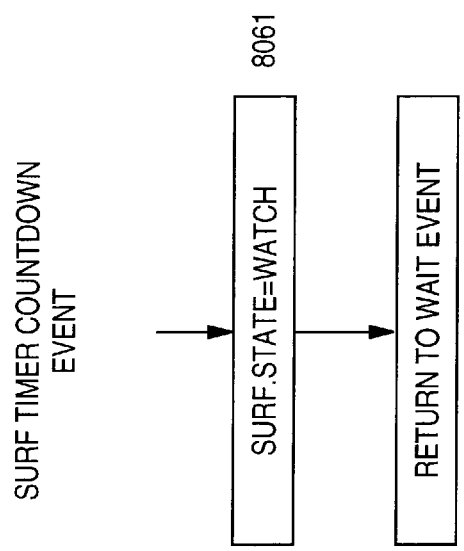
FIG. 8(e) shows the Surf Timer Countdown complete event response.

FIG. 8(e) depicts the procedure for handling a surf timer expiration event. In this case the surf timer has expired indicating that the subscriber has not changed channels within the allocated surf interval or within the $T_{SURF}$ time frame. Therefore, the event handler for the surf timer event countdown complete event sets the SURF.STATE=WATCH as shown in step 8061 and control is returned to the main event handler or wait event.

FIG. 8(d) depicts the procedure involved in opening a new AVI record. Steps 6125 and 6127 are as described for the case without the channel surfing feature. Step 8033 clears the surfed bit in the BCT entry.

Figure 9:
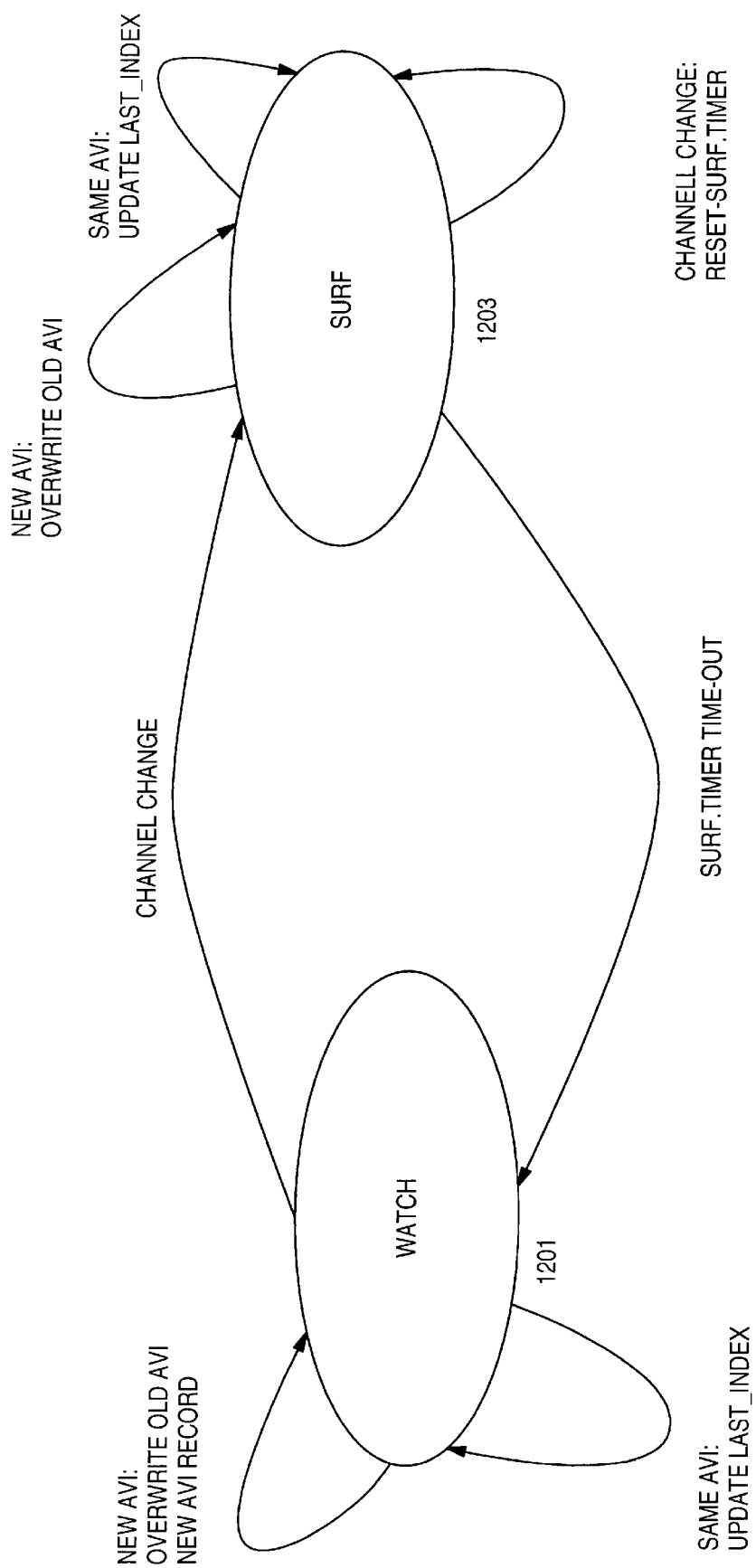
FIG. 9 shows a state diagram for the collection process in a home station.

FIG. 9 depicts a state diagram for the surfing state variable SURF.STATE.

Behavior Collection Table (BCT)

Sample BCTs are shown in FIGS. 10–13. In FIG. 10, note that AVI identification number as shown in column 601 of the table and the Start index in column 603 are derived from the AVI information embedded in the AVM provided to the home station and displayed on the home station's display. The start index 603 is the first time index that the home station receives for a particular AVM when the home station was presenting the AVM associated with the audio visual identifier 601 (or at least the time the AVI information was received on the channel to which the home station is tuned). The Last Index 605 is the last time index that the home station received while presenting the AVM. The AVI may have changed due to a commercial, a channel change event or termination or expiration of the AVM. For instance, the associated AVI may change without the subscriber changing channels in that a half-hour sitcom may have several commercials each having their own AVIs or the sitcom may end after all the presentation of the entire AVM.

As shown in FIG. 11, in an alternative embodiment the start index 603 and last index 605 may be replaced with start time 609 end time 611. In this alternative embodiment a time of day clock must be provided for in the home station so that when entries are to made into the behavior table the clock can be read and the time written to the behavior collection table.

Surfing Collection

The routine described in FIG. 8(c) may be modified such that each particular surfing interval is recorded such that in the table depicted in FIG. 10 the start index and last index may contain actual time values of when a particular subscriber was surfing. This may be of interest for sociological or marketing studies or for allocating bandwidth to the upstream channel. $T_{SURF}$, as has been described previously, is the interval between channel changes wherein the subscriber is considered to be channel surfing. It should be noted that $T_{SURF}$ must be greater than $T_{AVI}$. See also Table V.

Upstream or Reverse Channel Bandwidth Control (Reverse Channel Traffic Monitoring & Control)

Another feature of the present invention is the fact that certain variables (i.e., $T_{SURF}$ and $T_{AVI}$) may be controlled by a node outside the home station, thus an distribution node, AVI server or a BCC can control the surfing intervals and AVI intervals so that it may better be able to manage the generation of messages using the reverse channels. This also applies to the maximum size of the BCT and whether or not the BCT may be transmitted on the fly. Thus, if the BCT size is set dynamically by the BCC, every time a BCT entry is closed, it could be transmitted or the BCC may wait until the BCT reaches a much larger number of entries. This gives the BCC tremendous flexibility in controlling the reverse channel bandwidth in the system. Note also that the Channel Surfing Filter may be controlled by the BCC or other upstream node. When bandwidth demands are high for the upstream channel the BCC may broadcast a command in the AVI to turn on the surfing filter so that less information is transmitted to the upstream node. The commands may be directed to specific home stations by using the home station unique identifier in a message or command or may broadcasts to all home stations. The change variable command may consist of an address or home station ID, a variable identifier and the new variable value. The home station would receive the command, check the address and if applicable change the variable to the new value. The message may also contain a full set of variables in a predetermined order. Receipt of a command can be treated as another type of event to be processed as shown in FIG. 6(j). Thus, $T_{AVI}$, $T_{SURF}$, surfing filter enable (turn filter On, turn filter off), and BCT transmission criteria may be set by commands from the upstream node.

The upstream or reverse channel bandwidth may be utilized by not only multimedia devices in the home that are collecting user behavior (such as home stations) but also by personal computers or other communication devices. To reduce the impact of BCT transmissions on the reverse channel bandwidth during congested periods, a bandwidth monitor (BM) will be used. The bandwidth monitor will snoop on the reverse channel and measure the total utilization of the channel. These measurements will be instantaneous and over a moving period average and will be denoted as $\rho_i$, $\rho_a$ respectively. The bandwidth monitor will be located in the distribution node (FIG. 4(a)-107). The BM will forward the utilization measurements to the BCC (FIG. 4(a)-121) which will take actions described below.

The behavior collection centers attached to the reverse channels will measure both the instantaneous and average utilization of the channel. The average utilization will be measured over a moving window of duration $t_m$. The period average should be measured for an interval sufficient to filter out short term transitions. This interval is dependent on the seasonality of the overall traffic on the reverse channel. For example, if it is known that the traffic loads vary in 15 minute periods, the period average $t_m$ should measure the 15 minute moving average utilization in the reverse channel.

The BCC will examine the utilization measurements at periodic intervals. The examination interval $t_e$ will be less than the period moving average time interval. This will prevent rapid mode changes due to short term variations in the utilization. The BCC will receive the instantaneous and period average measurements from the BM located in the distribution node. These measurements will be compared to thresholds. Two thresholds will cause different traffic reduction actions. When the reverse channel utilization in a particular area exceeds the batch-send threshold $T_B$, the BCC will ask all home stations in the affected reverse channel to revert to batched transmission of behavior collection tables. Batched transmission means that the home stations will not send partially filled behavior collection tables. Instead, they will wait until the table is full. This will reduce the transmission overheads associated with short BCT transmissions. It will also postpone most BCT transmissions to a later time when there is potentially less congestion in the reverse channel.

Higher congestion in the reverse channel will be detected when the utilization in the reverse channel exceeds the stop-send threshold $T_S$. When this is detected, home stations will be instructed to hold their behavior collection tables until further notice. All home stations will continue to fill their BCTs. If the BCTs become full, all new BCT entries will be thrown away. This behavior preserves the old information while minimizing the loss of newly generated data.

When the congestion conditions are cleared, the home stations will be instructed to send their filled behavior collection tables.

The thresholds will be in tuples of instantaneous and period average measurements. Each tuple will consist of an instantaneous exceed threshold, a period average exceed threshold, and a period average drop threshold, denoted as $T_b=(\rho_{bi}, \rho_{be}, \rho_{bd})$. The instantaneous exceed threshold $\rho_{bi}$ denotes the instantaneous utilization of the reverse channel that must be exceeded to cause a transition to the batching mode. For the transition to take place, the period average utilization $\rho_{be}$ should be exceeded as well. Finally, to revert to the normal mode, the period average utilization must drop below the drop threshold $\rho_{bd}$. Typically, to prevent oscillations, the thresholds should be set such that $\rho_{bi} > \rho_{be}$ and $\rho_{bd} < \rho_{be}$. For example, the batch-send threshold tuple $T_b=(50\%, 35\%, 25\%)$ will indicate that the period average measure should be greater than 35% and the instantaneous measurement should be greater than 50% to trigger batch sending. To reinstate normal operations, the period average measure should drop below 25%. The same tuple format will apply to the stop-send threshold $T_s=(\rho_{si}, \rho_{sc}, \rho_{sd})$. However, the instantaneous, average-exceed and average-drop thresholds to initiate and terminate the stop-send mode should be higher than the batch-send thresholds.

The pseudo-code for the threshold monitoring and mode changes is shown below

```
do
{
if((ρ_i>ρ_bi && ρ_a>ρ_bc) && (mode==NORMAL))
    mode=BATCH-SEND;
else if(ρ_a<ρ_bd)
    mode=NORMAL;
else if(ρ_i>ρ_si && ρ_a>ρ_se)
    mode=STOP-SEND;
else if(ρ_a<ρ_sd)
    mode=BATCH-SEND;
sleep(mode_delay)/* set the mode every mode_delay seconds where */
/* the mode_delay is equal to the evaluation interval */
} while (1);
```

Privacy Features

Another feature of the presentation invention is providing the subscriber with a privacy control feature. Subscribers may not wish to have their viewing habits collected or monitored. The privacy feature provides a subscriber with control of when information is collected and/or transmitted. Thus, when PRIVACY is set to ON information is not transmitted. In alternative embodiments the information may also not be collected. However, the subscriber may wish to see what has been presented on the home station without providing the information to the upstream node (i.e., without transmitting). The content provider may wish to encourage use of behavior collection by providing different usage fees based on enablement or disablement of the behavior collection. Thus, subscribers can have their privacy but not the collection discount.

AVM Streams or Channels Without AVI Information

Note also another feature of the present invention is collecting behavior information on channels that do not provide AVI information. When the subscriber changes a channel the AVM material presented to the subscriber changes. The AVI Information changes as the subscriber moves from channel to channel because the AVMs are different on different channels and each has different associated AVI information. Thus, one or more channels may not have AVI information embedded in the AVM. Therefore, when no AVI information is available the home station may store the appropriate channel designation along with a code that indicts that the AVI information was unavailable in the BCT. This channel designation may be for instance Channel 2. This may be stored in the BCT along with time information obtained from an internal clock. A post processing center may then be able to determine the exact material that was presented to the subscriber on the captured channel (i.e., Channel 12). As ITV is implemented more and more providers and distribution nodes will provide the AVI information resulting in fewer and fewer entries where no AVI information is available.

Multiple Channel Viewing

Although, collection of subscriber behavior information as described above assumes single channel viewing, the table can be easily modified to incorporate multiple channel viewing such as is found with picture in picture TV sets. The home station would of course need to be capable of two channel operation. A channel field could be added to table to indicate which AVM were being viewed on which channel. Home stations that support P-in-P may add major/minor rank to the AVI information being collected. This major/minor will provide additional information as to which program is allocated to the larger or smaller portions of the presentation screen VCR Command Capture for VOD The behavior collection mechanism may also be programmed to collect information on such features as a VOD pause. In VOD where a virtual VCR is provided for information on PAUSE, REWIND, SLOMO, FAST FORWARD may also be collected. These features may have preassigned AVI information or simply have the text "PAUSE" etc entered into the AVI Identifier column of the BCT with index provided by an internal clock. This information may also, or in lieu of home station collection, be captured by the VOD provider since the interactive commands are conveyed to the provider for presentation control.

Other Features

A determination can be made as to whether any of the AVI extended fields are present. If extended fields are present they may be processed and utilized with other features of the present invention. For instance, title information may be shown on the display screen along with cost data, network provider information. The title data may also show rating or classification information. Thus title, cost and rating information are displayed on the subscribers display screen and the mode is set. The mode identifies actions that the may be taken by the subscriber or the level of interactivity (i.e., what type of subscriber feedback is permissible, required bandwidth and quality of service). The mode allows the home station and upstream node to know what uplink requirements are necessary so that any necessary communications link(s) can be established.

Subscriber Billing & Monitoring

Although not shown in FIG. 2, a cost field may also be added such that the cost is displayed to the subscriber. For example, a VOD application the subscribers screen may contain title, category of movie to be viewed, the rating and mode. The mode could be for instance VCR mode which would enable the subscriber to control the VOD presentation of the movie like a VIDEO in a VCR. Thus, a virtual VCR mode is provided. The information supplied by the extend AVI fields is used to provide the subscriber with information and to control the home station. The additional information may also be stored in additional columns of the BCT. The subscriber could then review what AVMs were presented on the home station and their associated cost. This benefits parents who can review the viewing habits of their children. Although, the BCT requires more memory with these features the entire table would not have to be transmitted only the information that is required (i.e., AVI identifier, and associated indexes). The BCT may also provide an additional column to indicate which data has been provided to the upstream node since the subscriber will most likely want to see viewing characteristics that have been sent as well as those that have not yet been sent.

Subscriber Profiles

The BCC may include profiles for each subscriber home station. Such information may include a record of ITV purchases or ordering. Profile information is obtained from the subscriber when the subscriber initially subscribes and/or from the reported information from the home station. This information can also be used for billing and tracking purposes as well. The cost data for ordered AVMs may also be captured and stored in the home station. Subscribers could then review current ITV expenses. The interactive review of the ITV expenses could be activated by a special code or specific command issued by the subscriber. This also would enable the subscriber to review and monitor the ITV services ordered by the household. This is particularly important for parental monitoring of the content and amount time children spend watching or interacting via Home Station The home station may be a set-top terminal, a digital or analog audio receiver equipped to decode and present AVMs, or a PC, or an adapter card designed for use in a PC in conjunction with a TV. The AVMs may be presented to the subscriber on a PC screen, picture tube, projection device, TV screen or any other display device. The audio portion, is presented to the subscriber using speakers. If the AVMs is audio only, (i.e, cable radio) then only the speakers are required. The home station may exist in various forms. In a cable television environment, a set-top may act as the home station. A PC may also be used as a home station by connecting it to digital broadcast networks over cable or through other data broadcast network implementations such as over satellite, traditional LANs etc. The home station functions may also be integrated into a TV set.

Figure 15:
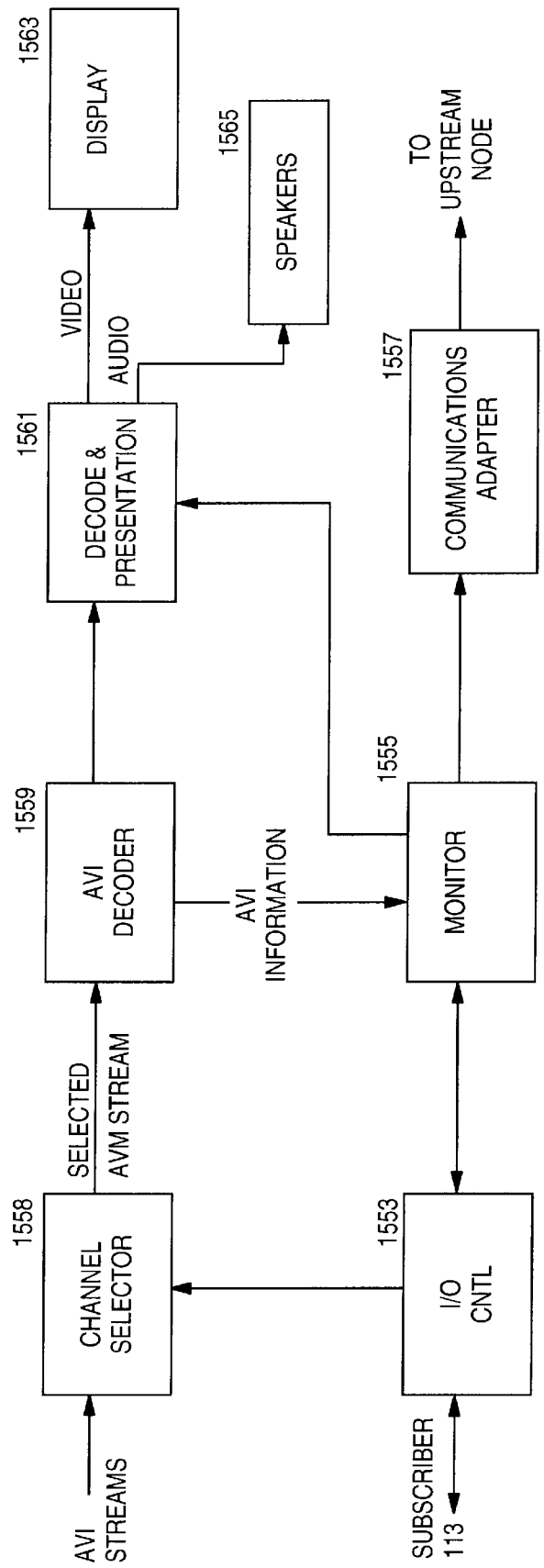
FIG. 15 shows a functional overview of a home station.

The home station has the following basic features: broadcast signal reception (analog or digital or both), AVI decode (i.e., Out-of-band or in-band digital signal reception), Up-Stream transmission capability (to send the collected information back to the up stream node), a subscriber channel selection capability, a processor with a software system and memory to perform the above identified functions. A functional overview of a home station is shown in FIG. 15. The subscriber selects from one or more AVM streams using some form of I/O device. Typically the subscriber uses a remote control device 1551, although a standard keyboard or PDA or other device may be utilized. The subscriber's input is handled by the I/O controller and is provided to the monitor 1555. The monitor 1555 (Home station controller) may provide a channel selection function or the channel selection function may be performed by a channel selection device 1558 connected to the I/O controller as shown in FIG. 15. Note that the channel selector functions as a tuner to tune to the home station to the channel selected by the subscriber. Typically the tuner receives many channels from which the subscriber selects one. After the channel selection function only one channel is output. The selected channel is provided to an AVI decoder 1559. The AVI decoder extracts AVI information from the selected AVM stream and provides the AVI information to the Monitor function 1555. The AVM stream is then processed much as any other AVM stream by the decode and presentation function 1561. Note also the display device 1563 and speakers 1565. Decoding in 1561 will depend on the signal format of the AVM stream as discussed above.

The Monitor 1555 can communicate with an upstream node using the communications adapter controller 1557. The communications adapter may be a cable modem or other device for communicating with the upstream node. The communication adapter adapts upstream messages to the particular communications medium utilized for upstream traffic. Monitor 1555 is also coupled to the decode and presentation function 1561. The monitor may in some instances modify the AVM to be presented to the subscriber. This may entail injecting messages for the subscriber or modifying the AVM itself such as for screening purposes.

Figure 16:
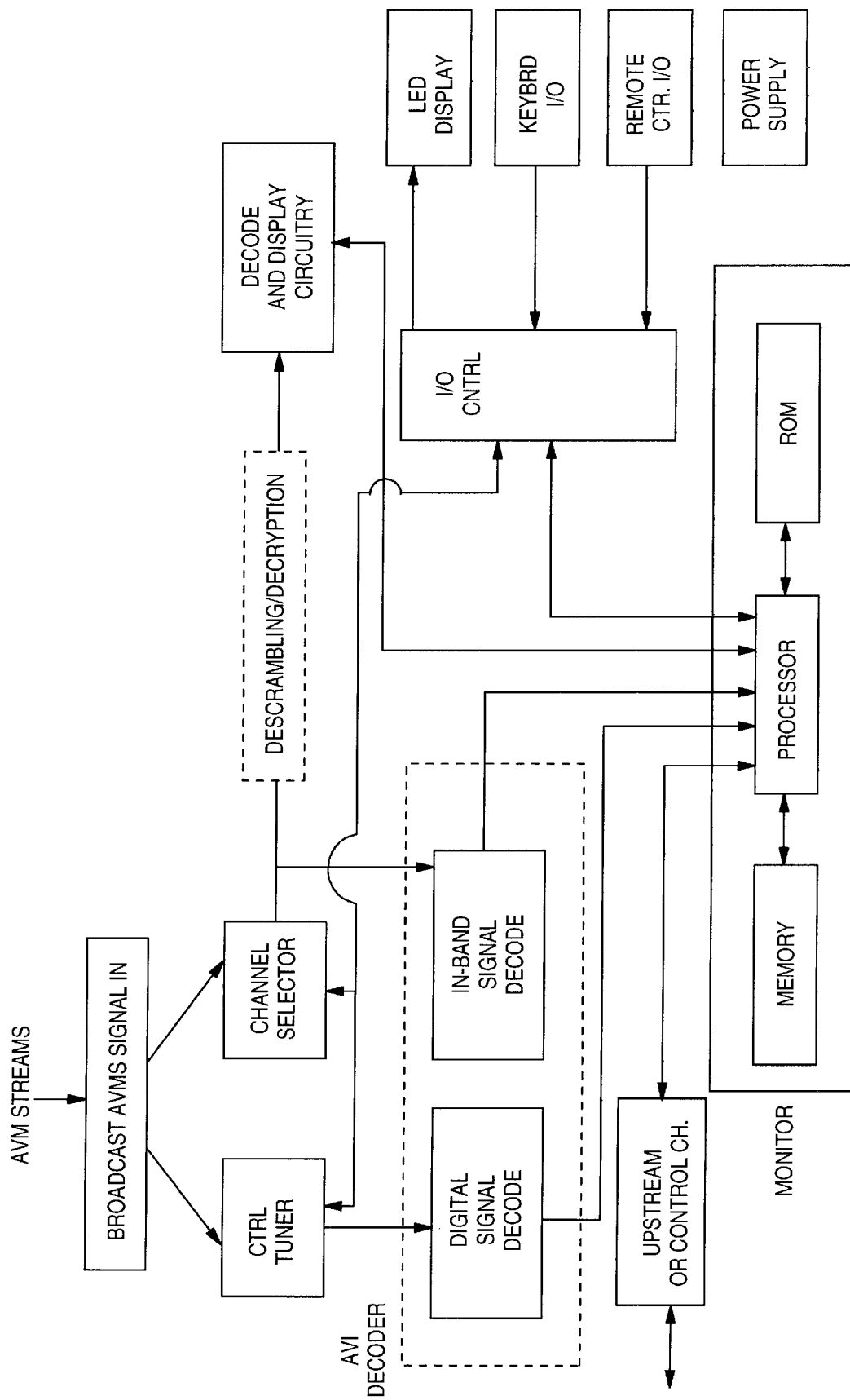
FIG. 16 shows a more detailed functional overview of a home station.

FIG. 16 adds some detail to the home station. In FIG. 16 the AVI decoder is separated into an in band signal decoder for extracting AVI information from the AVMs that are sent with the AVM such as using the VBI for AVI information. When a set-top terminal is used as a home station, analog or digital television and audio signals will carry the AVI. In the analog case, the AVI may be embedded into the vertical blanking interval of the video signal, similar to the embedding of closed captions. In this case, the data will flow through the channel selector, into the in-band signal decoder, then into the processor, where the data collection mechanism will process the AVI. For digital video broadcasts, after the channel selector, the AVI information will be filtered by the in-band signal decoder then sent to the processor. For digital audio broadcasts, the same mechanism will apply. FIG. 16 also depicts the use of descrambling and decryption that may be found in some systems. Note that the AVI decoder might be placed after the descrambler and decrytper depending on the particular AVI encoding mechanism utilized. FIG. 16 also depicts a wide variety of subscriber input devices. The subscriber may input information with a keyboard, with a remote, and/or a touch LED display and receive information on the LED display. The monitor function is also shown as a processor, Memory and ROM.

Figure 17:
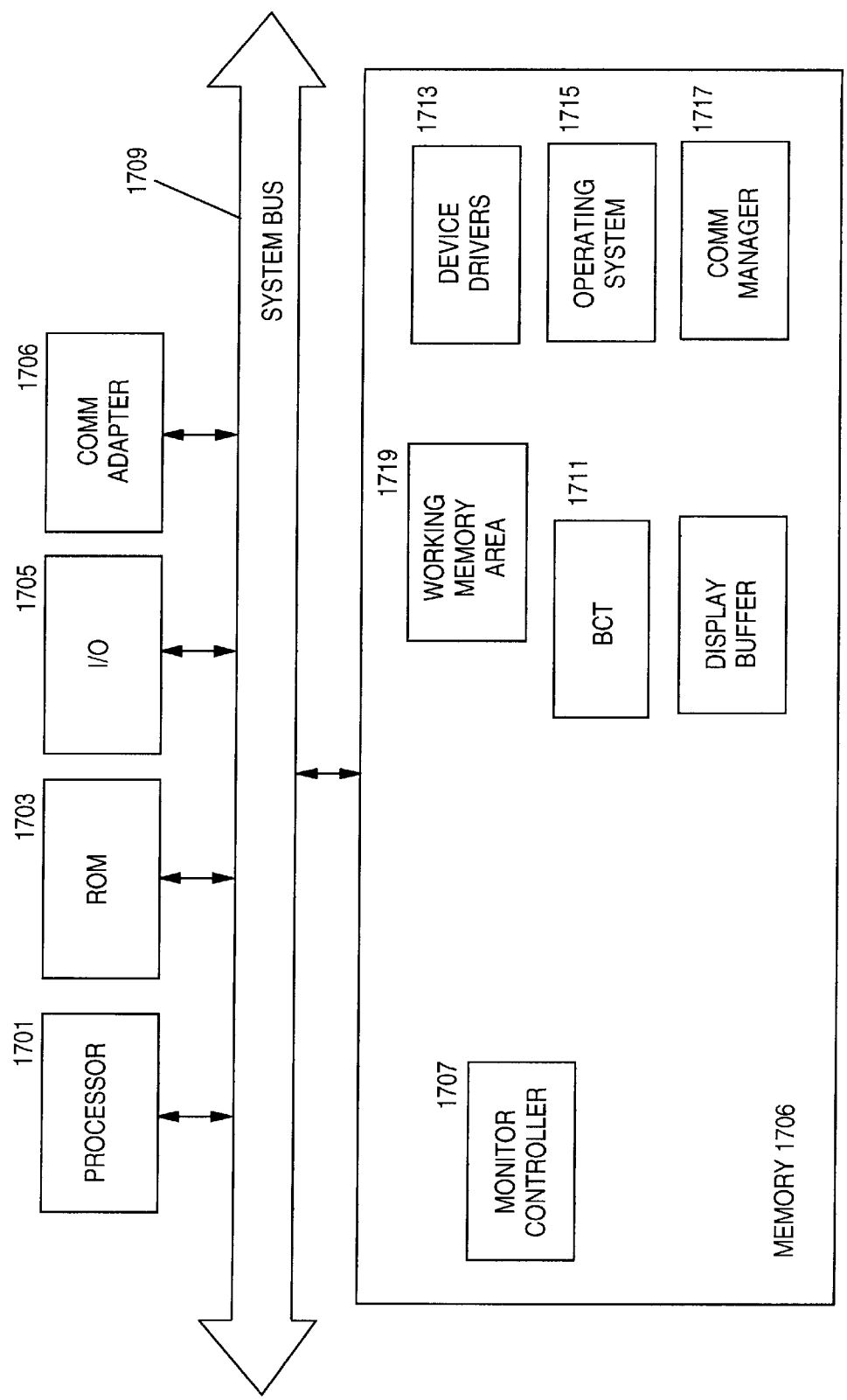
FIG. 17 shows an embodiment of the monitor function.

The preferred embodiment of the Monitor function is one or more software systems. One embodiment of the present invention is shown in FIG. 17. The Monitor controller 1707 is an event driven process that responds to events that are generated by the subscriber, the AVMs, or the hardware and software systems. The Monitor 1555 is shown in FIG. 17 as having a processor 1701 connected by a system bus 1709 to ROM 1703, I/O Controller 1705 and memory 1707. The monitor is depicted in FIG. 17 after it has been booted up and with several functional components/software systems located in the memory and is a collection of functions and data items. These functions and data items were explained in detail above. As shown in FIG. 17 the preferred embodiment of this invention comprises a set of software systems. The monitor controller 1707 (i.e., the event driven process) is a software system that operates with BCT 1711. Also included is I/O controller 1705 to which input devices including a keyboard, mouse and other devices may be attached. Other input devices such as other pointing devices or a voice input sensors or image sensors may also be attached. Other pointing devices include tablets, numeric keypads, touch screen, touch screen overlays, track balls, joy sticks, light pens, thumb wheels etc. The I/O 1705 can be connected to communications lines, disk storage, input devices, output devices or other I/O equipment. The Monitor system shown in FIG. 17 may also be connected to the upstream node via the communications adapter 1706. Communications between the home station and an upstream node is provided via the communications manager 1717, a software system. Communications manager 1717 provides for the sending and receiving of data and requests. The memory 1706 also includes an operating system 1715, device drivers 1713 which interpret the electrical signals generated by devices such as the remote, a working memory area 1719 which can be utilized by any of the elements shown in memory. The working memory area can be utilized by any of the functions or software systems and it may also be used to store the various data items. The working memory area 1719 may be partitioned amongst the elements and within an element. The working memory area 1719 may be utilized for communication, buffering, temporary storage, or storage of data while a program is running. Note that although shown as a single entry, the memory may consist of any combination of physical memory devices. In the preferred embodiment, the memory has ROM, RAM and FLASH memory.

The monitor function may also be run on a PC, using the PC's mother board to perform the monitor function and decode function. The PC must include a TV Tuner card in order to decode the TV signals and present the TV signals to a video suitable for display on the PC display screen. Note that the TV card and the AVI decoder may be included on the same card.

The monitor function may also be included in a settop box which is connected to the audio-visual material streams for input and upstream communications and to a TV set as for presentation of AVMs the subscriber.

Computer Usable Medium

The software system for controlling the home station may be distributed to subscribers on a computer usable medium such as floppy disk, diskettes, CD-ROM, PCMCIA cards, Flash memory cards and/or any other computer usable medium. Note that the software system may also be downloaded by the subscriber or a home station software program from an upstream node or from an Internet node accessible via the communications adapter.

Analysis of Collected Data

Using information collected at the BCCs, advertisement effectiveness, targeting and demographics can be determined with excellent granularity. Advertisers can determine how many home stations were tuned in to their particular advertisements. If sub-portion identifiers are utilized the advertisers may be able to determine when subscribers tuned out so that ineffective shots or scenes can be replaced. Advertisements can accurately target the desired markets. The information gathered can be used by information providers to provide ad insertion. Advertising insertion may reduce the cost of providing VOD services to the home station. Advertising can be targeted to very specific customer sets. This may also provide for the evaluation of scope and extent and effectiveness per household. Advertisers know what it costs per household. Actual viewing data is collected rather than the statistical collection techniques used by Nielsen/Arbitron selection. Information collected can be used for a wide variety of purposes.

The BCC or the home station (i.e., a CD ROM or memory) may include more detailed information such as is shown in TABLE VI & VII. TABLE VI associates AVI ID number with titles providers & descriptions. TABLE VII is a logical view of a data base associating AVI with subportion identifiers and sub-portion descriptions. These tables may be expanded to include additional information as required. For instance actors, producers, studio, category as well as audio & video clips associated with particular audio-visual material materials.

Information collected may also be used for sociological studies such as channel changing habits or channel surfing behavior. Information may also be correlated with subscriber profile (i.e., income levels, disposal income . . . ).

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. A home station for presenting audio-visual material to a subscriber, having a plurality of audio visual material streams as input, at least one audio-visual material stream having audio-visual identifier information encoded in said audio-visual material stream, said home station comprising:
   a remote that permits the subscriber to select for presentation an audio-visual material stream for presentation from a plurality of audio-visual streams;
   an audio-visual identifier decoder for extracting the audio-visual identifier information from the audio-visual material stream selected by the subscriber;
   a monitor coupled to the audio-visual identifier decoder for processing and storing the extracted audio-visual identifier information in a behavior collection table; and
   a surfing detector for determining channel surfing periods and accumulating each channel surfing period into one behavior collection table entry.

2. The home station of claim 1 wherein said surfing detector uses a surf timer wherein if the time of presentation of a selected audio-visual material stream is less than a surf timer threshold then a determination of surfing is made and no extracted audio-visual identifier information is collected.

3. The home station of claim 2 wherein if the time of presentation of a selected audio-visual material stream is greater than the surf timer threshold then a determination of watching is made and extracted audio-visual identifier information is collected.

4. The home station of claim 3 wherein the surfing detector may be activated or deactivated by a command embedded in the audio-visual identifier information.

5. The home station of claim 3 wherein the surf timer threshold may be updated by a command embedded in the audio-visual identifier information.

6. The home station in claim 1 further comprising:
   a communications adapter for sending the collected audio-visual identifier information onto an upstream channel.

7. The home station in claim 6 wherein the communication adapter sends the collected audio-visual identifier information in response to a transmit command embedded in audio-visual identifier information.

8. The home station in claim 6 wherein the communications adapter transmits the stored data when the behavior collection table reaches a predetermined size.

9. The home station in claim 6 wherein the communications adapter transmits the behavior collection table in a compressed form.

10. The home station in claim 6 wherein the communications adapter sends the collected audio-visual identifier information as it is decoded.

11. The home station of claim 6 wherein no extracted audio-visual identifier information is sent if the subscriber has indicated via the remote that privacy is desired.

12. The home station of claim 1 further comprising wherein the monitor causes presentation of the behavior collection table in response to the subscriber request input via the remote.

13. A home station for presenting audio-visual material to a subscriber, having a plurality of audio visual material streams as input, at least one audio-visual material stream having audio-visual identifier information encoded in said audio-visual material stream, said home station comprising:
   a remote that permits the subscriber to select for presentation an audio-visual material stream for presentation from a plurality of audio-visual streams;
   an audio-visual identifier decoder for extracting the audio-visual identifier information from the audio-visual material stream selected by the subscriber;
   a monitor coupled to the audio-visual identifier decoder for processing and storing the extracted audio-visual identifier information in a behavior collection table, the behavior collection table containing an audio-visual identifier identification field, a start index field and a stop index field.

14. The home station of claim 13 wherein the behavior collection table further includes a title field, a rating field, a sent indicator field and a cost field.

15. The home station in claim 13 further comprising:
   a communications adapter for sending the collected audio-visual identifier information onto an upstream channel.

16. The home station in claim 15 wherein the communication adapter sends the collected audio-visual identifier information in response to a transmit command embedded in audio-visual identifier information.

17. The home station in claim 15 wherein the communications adapter transmits the stored data when the behavior collection table reaches a predetermined size.

18. The home station in claim 15 wherein the communications adapter transmits the behavior collection table in a compressed form.

19. The home station in claim 15 wherein the communications adapter sends the collected audio-visual identifier information as it is decoded.

20. The home station of claim 15 wherein no extracted audio-visual identifier information is sent if the subscriber has indicated via the remote that privacy is desired.

21. The home station of claim 13 further comprising wherein the monitor causes presentation of the behavior collection table in response to the subscriber request input via the remote.

22. A home station for presenting audio-visual material to a subscriber, having a plurality of audio visual material streams as input, at least one audio-visual material stream having audio-visual identifier information encoded in said audio-visual material stream, said home station comprising:
   a remote that permits the subscriber to select for presentation an audio-visual material stream for presentation from a plurality of audio-visual streams;
   an audio-visual identifier decoder for extracting the audio-visual identifier information from the audio-visual material stream selected by the subscriber;
   a monitor coupled to the audio-visual identifier decoder for collecting and processing the extracted audio-visual identifier information, the collected audio-visual identifier information is stored in a behavior collection table by the monitor; wherein the monitor further comprises a no audio-visual identifier detector for determining when no audio-visual identifier information is available in the selected audio-visual material stream and the no audio-visual identifier detector uses an audio-visual identifier timer wherein if the time of presentation of the selected audio-visual material stream is less than the audio-visual identifier timer threshold then a determination of audio-visual identifier available is made and if the time of presentation of the selected audio-visual material stream is greater than the audio-visual identifier timer threshold and no audio-visual identifier information has been decoded then a determination of audio-visual identifier not available is made.

23. The home station of claim 22 wherein if audio-visual identifier is not available the monitor stores a channel identifier for the selected audio-visual material stream and an initial time of presentation obtained from an internal clock in the behavior collection table.

24. The home station of claim 23 wherein the no audio-visual identifier detector may be activated or deactivated by a command embedded in the audio-visual identifier information.

25. The home station of claim 23 wherein the audio-visual identifier timer threshold may be updated by a command embedded in the audio-visual identifier information.

26. The home station of claim 25 further comprising a surfing detector for determining channel surfing periods and accumulating each channel surfing period into one behavior collection table entry.

27. The home station of claim 26 wherein said surfing detector uses a surf timer wherein if the time of presentation of a selected audio-visual material stream is less than a surf timer threshold then a determination of surfing is made an no extracted audio-visual identifier information is collected.

28. The home station of claim 27 wherein if the time of presentation of a selected audio-visual material stream is greater than the surf timer threshold then a determination of watching is made and extracted audio-visual identifier information is collected.

29. The home station of claim 28 wherein the surfing detector may be activated or deactivated by a command embedded in the audio-visual identifier information.

30. The home station of claim 28 wherein the surf timer threshold may be updated by a command embedded in the audio-visual identifier information.

31. In a home station having a plurality of audio-visual material streams as input with at least one audio-visual material stream having audio-visual identifier information encoded in the audio-visual material stream, a method comprising the following steps:
  selecting an audio-visual material stream by a subscriber;
  decoding said audio-visual identifier information encoded in the selected audio-visual material stream;
  monitoring said decoded audio-visual identifier information and updating a behavior collection table in response to changes in the audio-visual identifier information; and,
  determining channel surfing periods and accumulating each channel surfing period into one behavior collection table entry.

32. The method of claim 31 wherein the changes in audio-visual identifier information result from the subscriber selecting a different audio-visual material stream.

33. The method of claim 31 wherein the step of determining channel surfing periods uses a surf timer wherein if the time of presentation of a selected audio-visual material stream is less than a surf timer threshold then a determination of surfing is made and no extracted audio-visual identifier information is collected.

34. The method of claim 33 wherein if the time of presentation of a selected audio-visual material stream is greater than the surf timer threshold then a determination of watching is made and extracted audio-visual identifier information is collected.

35. The method of claim 34 further comprising:
  receiving a command embedded in the audio-visual identifier information which activates or deactivates determination of channel surfing periods.

36. The method of claim 34 further comprising:
  receiving a command embedded in the audio-visual identifier information which updates the surf timer threshold.

37. The method of claim 31 further comprising:
  sending the behavior collection table onto an upstream channel.

38. The method of claim 37 wherein the behavior collection table is sent in response to a transmit command embedded in audio-visual identifier information.

39. The method of claim 37 wherein the behavior collection table is sent in response to the behavior collection table reaching a predetermined size.

40. The method of claim 37 wherein the extracted audio-visual identifier information is sent after it is decoded.

41. The method of claim 37 further comprising:
  suppressing sending of the behavior collection table if the subscriber has indicated via the remote that privacy is desired.

42. The home station of claim 31 further comprising:
  presenting the behavior collection table in response to a subscriber request.

43. In a home station having a plurality of audio-visual material streams as input with at least one audio-visual material stream having audio-visual identifier information encoded in the audio-visual material stream, a method comprising the following steps:
  selecting an audio-visual material stream by a subscriber;
  decoding said audio-visual identifier information encoded in the selected audio-visual material stream;
  monitoring said decoded audio-visual identifier information and updating a behavior collection table in response to changes in the audio-visual identifier information; and,
  determining when no audio-visual identifier information is available in the selected audio-visual material stream using an audio-visual identifier timer wherein if the time of presentation of the selected audio-visual material stream is less than the audio-visual identifier timer threshold then a determination of audio-visual identifier available is made and if the time of presentation of the selected audio-visual material stream is greater than the audio-visual identifier timer threshold and no audio-visual identifier information has been decoded then a determination of audio-visual identifier not available is made.

44. The method of claim 43 wherein if audio-visual identifier is not available the monitor stores a channel identifier for the selected audio-visual material stream and an initial time of presentation obtained from an internal clock in the Behavior Collection Table.

45. The method of claim 44 wherein determination of when no audio-visual identifier is activated or deactivated by a command embedded in the audio-visual identifier information.

46. The method of claim 44 further comprising:
updating the audio-visual identifier timer threshold using a command embedded in the audio-visual identifier information.

47. The method of claim 45 further comprising:
determining channel surfing periods and accumulating each channel surfing period into one behavior collection table entry.

48. The method of claim 47 wherein the channel surfing periods are determined using a surf timer wherein if the time of presentation of a selected audio-visual material stream is less than a surf timer threshold then a determination of surfing is made an no extracted audio-visual identifier information is collected.

49. The method of claim 48 wherein if the time of presentation of a selected audio-visual material stream is greater than the surf timer threshold then a determination of watching is made and extracted audio-visual identifier information is collected.

50. The method of claim of claim 49 further comprising:
activating or deactivating the channel surfing determination using a command embedded in the audio-visual identifier information.

51. The method of claim 49 further comprising:
updating the surf timer threshold using a command embedded in the audio-visual identifier information.

52. In a home station having a plurality of audio-visual material streams as input with at least one audio-visual material stream having audio-visual identifier information encoded in the audio-visual material stream, a method comprising the following steps:
selecting an audio-visual material stream by a subscriber;
decoding said audio-visual identifier information encoded in the selected audio-visual material stream;
monitoring said decoded audio-visual identifier information and updating a behavior collection table in response to changes in the audio-visual identifier information wherein each entry in the behavior collection table contains an audio-visual identifier identification field, a start index field and a stop index field.

53. The method of claim 52 wherein the behavior collection table further includes a title field, a rating field, a sent indicator field and a cost field.

54. The home station of claim 52 further comprising:
presenting the behavior collection table in response to a subscriber request.

55. The method of claim 52 further comprising:
determining channel surfing periods and accumulating each channel surfing period into one behavior collection table entry.

56. The method of claim 52 further comprising:
sending the behavior collection table onto an upstream channel.

57. The method of claim 56 wherein the behavior collection table is sent in response to a transmit command embedded in audio-visual identifier information.

58. The method of claim 56 wherein the behavior collection table is sent in response to the behavior collection table reaching a predetermined size.

59. The method of claim 56 wherein the extracted audio-visual identifier information is sent after it is decoded.

60. The method of claim 56 further comprising:
suppressing sending of the behavior collection table if the subscriber has indicated via the remote that privacy is desired.

61. An article of manufacture comprising a computer useable medium having a computer readable program embodied in said medium, wherein the computer readable program when executed on a home station causes the home station to:
receive an audio-visual material stream from a selected channel;
decode said audio-visual identifier information encoded in the received audio-visual material stream;
monitor said decoded audio-visual identifier information and update a behavior collection table in response to changes in the audio-visual identifier information; and,
determine channel surfing periods and accumulate each channel surfing period into one behavior collection table entry.

62. The article of manufacture of claim 61 wherein the changes in audio-visual identifier information result from the subscriber selecting a different audio-visual material stream.

63. The article of manufacture of claim 61 wherein determining channel surfing periods uses a surf timer wherein if the time of presentation of a received audio-visual material stream is less than a surf timer threshold then a determination of surfing is made and no extracted audio-visual identifier information is collected.

64. The article of manufacture of claim 63 wherein if the time of presentation of a received audio-visual material stream is greater than the surf timer threshold then a determination of watching is made and extracted audio-visual identifier information is collected.

65. The article of manufacture of claim 64 wherein determination of the channel surfing periods may be activated or deactivated by receiving a command embedded in the audio-visual identifier information.

66. The article of manufacture of claim 64, further including causing the home station to:
update the surf timer threshold in response to receiving a command embedded in the audio-visual identifier information.

67. The article of manufacture of claim 63, further including causing the home station to:
send the behavior collection table onto an upstream channel.

68. The article of manufacture of claim 67 wherein the behavior collection table is sent in response to a transmit command embedded in audio-visual identifier information.

69. The article of manufacture of claim 67 wherein the behavior collection table is sent in response to the behavior collection table reaching a predetermined size.

70. The article of manufacture of claim 67 wherein the extracted audio-visual identifier information is sent after it is decoded.

71. The article of manufacture of claim 67, further including causing the home station to:
suppress sending of the behavior collection table if the subscriber has indicated that privacy is desired.

72. The article of manufacture of 61 further including causing the home station to:
present the behavior collection table in response to a subscriber request.

73. An article of manufacture comprising a computer useable medium having a computer readable program embodied in said medium, wherein the computer readable program when executed on a home station causes the home station to:
receive an audio-visual material stream from a selected channel;

decode said audio-visual identifier information encoded in the received audio-visual material stream;

monitor said decoded audio-visual identifier information and update a behavior collection table in response to changes in the audio-visual identifier information; and, determine when no audio-visual identifier information is available in the received audio-visual material stream using an audio-visual identifier timer wherein if the time of presentation of the received audio-visual material stream is less than the audio-visual identifier timer threshold then a determination of audio-visual identifier available is made and if the time of presentation of the received audio-visual material stream is greater than the audio-visual identifier timer threshold and no audio-visual identifier information has been decoded then a determination-of audio-visual identifier not available is made.

74. The article of manufacture of claim 73, further including causing the home station to:

store a channel identifier for the received audio-visual material stream and an initial time of presentation in the behavior collection table, if an audio-visual identifier is not available.

75. The article of manufacture of claim 74, further including causing the home station to:

activate or deactivate determination of when no audio-visual identifier is available from a command embedded in the audio-visual identifier information.

76. The article of manufacture of claim 74 further including causing the home station to:

update the audio-visual identifier timer threshold using a command embedded in the audio-visual identifier information.

77. The article of manufacture of claim 75 further including causing the home station to:

determine channel surfing periods and accumulate each channel surfing period into one behavior collection table entry.

78. The article of manufacture of claim 77 wherein the channel surfing periods are determined using a surf timer wherein if the time of presentation of a received audio-visual material stream is less than a surf timer threshold then a determination of surfing is made an no extracted audio-visual identifier information is collected.

79. The article of manufacture of claim 78 wherein if the time of presentation of a received audio-visual material stream is greater than the surf timer threshold then a determination of watching is made and extracted audio-visual identifier information is collected.

80. The article of manufacture of claim of claim 79 further including causing the home station to:

activate or deactivate the channel surfing determination using a command embedded in the audio-visual identifier information.

81. The article of manufacture of claim 79 further including causing the home station to:

update the surf timer threshold using a command embedded in the audio-visual identifier information.

82. An article of manufacture comprising a computer useable medium having a computer readable program embodied in said medium, wherein the computer readable program when executed on a home station causes the home station to:

receive an audio-visual material stream from a selected channel;

decode said audio-visual identifier information encoded in the received audio-visual material stream;

monitor said decoded audio-visual identifier information and update a behavior collection table in response to changes in the audio-visual identifier information wherein each entry in the behavior collection table contains an audio-visual identifier identification field, a start index field and a stop index field.

83. The article of manufacture of claim 82 wherein the behavior collection table further includes a title field, a rating field, a sent indicator field and a cost field.

84. The home station of claim 82 further including causing the home station to:

present the behavior collection table in response to a subscriber request.

85. The article of manufacture of claim 82 further including causing the home station to:

determine channel surfing periods and accumulate each channel surfing period into one behavior collection table entry.

86. The article of manufacture of claim 82 further including causing the home station to:

send the behavior collection table onto an upstream channel.

87. The article of manufacture of claim 86, further including causing the home station to:

send the behavior collection table in response to a transmit command embedded in audio-visual identifier information.

88. The article of manufacture of claim 86, further including causing the home station to:

send the behavior collection table in response to the behavior collection table reaching a predetermined size.

89. The article of manufacture of claim 86, further including causing the home station to:

send the extracted audio-visual identifier information after it is decoded.

90. The article of manufacture of claim 86 further including causing the home station to:

suppress sending of the behavior collection table if the subscriber has indicated that privacy is desired.

91. An audio-video material distribution system comprising:

a video distribution node for outputting a plurality of audio visual material streams with at least one audio-visual material stream having encoded audio-visual identifier information;

a local distribution network coupled to said video distribution node capable of providing said plurality of output audio-visual material streams to one or more home stations connected to the local distribution network, said local distribution network having a reverse channel whereby the home stations can send information to said video distribution node;

wherein at least one home station decodes the audio-visual identifier information, monitors and stores the decoded audio-visual identifier information in a behavior collection table using a surfing detector for determining channel surfing periods and accumulating each channel surfing period into one behavior collection table entry, and returns said behavior collection table to the video distribution node via said reverse channel of the local distribution network.

92. The system in accordance with claim 91 which includes a bandwidth monitor for measuring utilitization of the reverse channel.

93. The system of claim 92 wherein the bandwidth monitor in response to high reverse channel utilization sends a command to all home stations in said audio-visual identifier information of at least one of the audio-visual material streams to halt sending of decoded audio-visual identifier information.

94. An audio-video material distribution system comprising:
- a video distribution node for outputting a plurality of audio visual material streams with at least one audio-visual material stream having encoded audio-visual identifier information;
- a local distribution network coupled to said video distribution node capable of providing said plurality of output audio-visual material streams to one or more home stations connected to the local distribution network, said local distribution network having a reverse channel whereby the home stations can send information to said video distribution node;
- wherein at least one home station decodes the audio-visual identifier information, monitors and stores the decoded audio-visual identifier information in a behavior collection table, the behavior collection table including an audio-visual identifier identification field, a start index field and a stop index field, and returns said behavior collection table to the video distribution node via said reverse channel of the local distribution network.

95. The system in accordance with claim 94 which includes a bandwidth monitor for measuring utilitization of the reverse channel.

96. The system of claim 95 wherein the bandwidth monitor in response to high reverse channel utilization sends a command to all home stations in said audio-visual identifier information of at least one of the audio-visual material streams to halt sending of decoded audio-visual identifier information.

97. An audio-video material distribution system comprising:
- a video distribution node for outputting a plurality of audio visual material streams with at least one audio-visual material stream having encoded audio-visual identifier information;
- a local distribution network coupled to said video distribution node capable of providing said plurality of output audio-visual material streams to one or more home stations connected to the local distribution network, said local distribution network having a reverse channel whereby the home stations can send information to said video distribution node;
- wherein at least one home station decodes the audio-visual identifier information, monitors and stores the decoded audio-visual identifier information in a behavior collection table, wherein a no audio-visual identifier detector is used for determining when no audio-visual identifier information is available in the selected audio-visual material stream and the no audio-visual identifier detector uses an audio-visual identifier timer wherein if the time of presentation of the selected audio-visual material stream is less than the audio-visual identifier timer threshold then a determination of audio-visual identifier available is made and if the time of presentation of the selected audio-visual material stream is greater than the audio-visual identifier timer threshold and no audio-visual identifier information has been decoded then a determination of audio-visual identifier not available is made, and returns said behavior collection table to the video distribution node via said reverse channel of the local distribution network.

98. The system in accordance with claim 97 which includes a bandwidth monitor for measuring utilitization of the reverse channel.

99. The system of claim 98 wherein the bandwidth monitor in response to high reverse channel utilization sends a command to all home stations in said audio-visual identifier information of at least one of the audio-visual material streams to halt sending of decoded audio-visual identifier information.

* * * * *